US012783967B2

(12) United States Patent
Crook et al.

(10) Patent No.: US 12,783,967 B2
(45) Date of Patent: Nov. 3, 2026

(54) TECHNIQUES FOR RECOGNIZING ALTERNATIVE INPUT VIA GESTURE RECOGNITION TUPLES FOR USER INTERACTIONS WITH ASSISTANT SYSTEMS

(71) Applicant: Meta Platforms Technologies, LLC, Menlo Park, CA (US)

(72) Inventors: Paul Anthony Crook, Newcastle, WA (US); Xiaohu Liu, Bellevue, WA (US); Francislav P. Penov, Kirkland, WA (US); Rajen Subba, San Carlos, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 19/392,028

(22) Filed: Nov. 17, 2025

(65) Prior Publication Data

US 2026/0162417 A1 Jun. 11, 2026

Related U.S. Application Data

(63) Continuation of application No. 18/915,864, filed on Oct. 15, 2024, now Pat. No. 12,475,698, which is a (Continued)

(51) Int. Cl.

*G06Q 10/00* (2026.01)
*G06F 3/01* (2006.01)

(Continued)

(52) U.S. Cl.

CPC ............. *G06Q 10/00* (2013.01); *G06F 3/011* (2013.01); *G06F 3/013* (2013.01); *G06F 3/017* (2013.01);

(Continued)

(58) Field of Classification Search

CPC ............. G06F 16/176; G06F 16/24575; G06F 16/3322; G06F 16/3323; G06F 16/3344;

(Continued)

(56) References Cited

U.S. PATENT DOCUMENTS

| | | | |
|---|---|---|---|
| 1,544,305 | A | 6/1925 | Fisher |
| 5,721,827 | A | 2/1998 | Logan et al. |

(Continued)

FOREIGN PATENT DOCUMENTS

| | | | |
|---|---|---|---|
| AU | 2017203668 | A1 | 1/2018 |
| CN | 101292282 | A | 10/2008 |

(Continued)

OTHER PUBLICATIONS

US 11,531,820 B2, 12/2022, Liu et al. (withdrawn)

(Continued)

*Primary Examiner* — Dmitriy Bolotin

(74) *Attorney, Agent, or Firm* — McDermott Will & Schulte LLP

(57) ABSTRACT

In one embodiment, a method includes receiving a user request from a first user from a client system associated with a first user, wherein the user request comprise a gesture-input from the first user and a speech-input from the first user, determining an intent corresponding to the user request based on the gesture-input by a personalized gesture-classification model associated with the first user, executing one or more tasks based on the determined intent and the speech-input, and sending instructions for presenting execution results of the one or more tasks to the client system responsive the user request.

20 Claims, 10 Drawing Sheets

Related U.S. Application Data continuation of application No. 18/449,525, filed on Aug. 14, 2023, now Pat. No. 12,125,272, which is a continuation of application No. 17/566,308, filed on Dec. 30, 2021, now Pat. No. 11,727,677, which is a continuation of application No. 17/010,619, filed on Sep. 2, 2020, now Pat. No. 11,231,946, which is a continuation of application No. 16/388,130, filed on Apr. 18, 2019, now Pat. No. 10,802,848.

(60) Provisional application No. 62/660,876, filed on Apr. 20, 2018.

(51) Int. Cl.

| | |
|---|---|
| ***G06F 3/16*** | (2006.01) |
| ***G06F 7/14*** | (2006.01) |
| ***G06F 9/451*** | (2018.01) |
| ***G06F 16/176*** | (2019.01) |
| ***G06F 16/22*** | (2019.01) |
| ***G06F 16/23*** | (2019.01) |
| ***G06F 16/242*** | (2019.01) |
| ***G06F 16/2455*** | (2019.01) |
| ***G06F 16/2457*** | (2019.01) |
| ***G06F 16/248*** | (2019.01) |
| ***G06F 16/332*** | (2019.01) |
| ***G06F 16/3329*** | (2025.01) |
| ***G06F 16/334*** | (2025.01) |
| ***G06F 16/338*** | (2019.01) |
| ***G06F 16/903*** | (2019.01) |
| ***G06F 16/9032*** | (2019.01) |
| ***G06F 16/9038*** | (2019.01) |
| ***G06F 16/904*** | (2019.01) |
| ***G06F 16/951*** | (2019.01) |
| ***G06F 16/9535*** | (2019.01) |
| ***G06F 18/2411*** | (2023.01) |
| ***G06F 21/62*** | (2013.01) |
| ***G06F 40/205*** | (2020.01) |
| ***G06F 40/295*** | (2020.01) |
| ***G06F 40/30*** | (2020.01) |
| ***G06F 40/40*** | (2020.01) |
| ***G06N 3/006*** | (2023.01) |
| ***G06N 7/01*** | (2023.01) |
| ***G06N 20/00*** | (2019.01) |
| ***G06Q 10/40*** | (2026.01) |
| ***G06Q 10/42*** | (2026.01) |
| ***G06Q 10/48*** | (2026.01) |
| ***G06V 10/764*** | (2022.01) |
| ***G06V 10/82*** | (2022.01) |
| ***G06V 20/10*** | (2022.01) |
| ***G06V 40/20*** | (2022.01) |
| ***G10L 15/02*** | (2006.01) |
| ***G10L 15/06*** | (2013.01) |
| ***G10L 15/07*** | (2013.01) |
| ***G10L 15/16*** | (2006.01) |
| ***G10L 15/18*** | (2013.01) |
| ***G10L 15/183*** | (2013.01) |
| ***G10L 15/187*** | (2013.01) |
| ***G10L 15/22*** | (2006.01) |
| ***G10L 15/26*** | (2006.01) |
| ***G10L 17/06*** | (2013.01) |
| ***G10L 17/22*** | (2013.01) |
| ***H04L 5/02*** | (2006.01) |
| ***H04L 12/28*** | (2006.01) |
| ***H04L 41/00*** | (2022.01) |
| ***H04L 41/22*** | (2022.01) |
| ***H04L 43/0882*** | (2022.01) |
| ***H04L 43/0894*** | (2022.01) |
| ***H04L 51/02*** | (2022.01) |
| ***H04L 51/18*** | (2022.01) |
| ***H04L 51/216*** | (2022.01) |
| ***H04L 51/52*** | (2022.01) |
| ***H04L 67/306*** | (2022.01) |
| ***H04L 67/50*** | (2022.01) |
| ***H04L 67/5651*** | (2022.01) |
| ***H04L 67/75*** | (2022.01) |
| ***H04W 12/08*** | (2021.01) |
| *G10L 13/00* | (2006.01) |
| *G10L 13/04* | (2013.01) |
| *H04L 51/046* | (2022.01) |
| *H04L 67/10* | (2022.01) |
| *H04L 67/53* | (2022.01) |

(52) U.S. Cl.

CPC ................ *G06F 3/167* (2013.01); *G06F 7/14* (2013.01); *G06F 9/453* (2018.02); *G06F 16/176* (2019.01); *G06F 16/2255* (2019.01); *G06F 16/2365* (2019.01); *G06F 16/243* (2019.01); *G06F 16/24552* (2019.01); *G06F 16/24575* (2019.01); *G06F 16/24578* (2019.01); *G06F 16/248* (2019.01); *G06F 16/3323* (2019.01); *G06F 16/3329* (2019.01); *G06F 16/3344* (2019.01); *G06F 16/338* (2019.01); *G06F 16/90332* (2019.01); *G06F 16/90335* (2019.01); *G06F 16/9038* (2019.01); *G06F 16/904* (2019.01); *G06F 16/951* (2019.01); *G06F 16/9535* (2019.01); *G06F 18/2411* (2023.01); *G06F 21/6245* (2013.01); *G06F 40/205* (2020.01); *G06F 40/295* (2020.01); *G06F 40/30* (2020.01); *G06F 40/40* (2020.01); *G06N 3/006* (2013.01); *G06N 7/01* (2023.01); *G06N 20/00* (2019.01); *G06Q 10/40* (2026.01); *G06Q 10/42* (2026.01); *G06Q 10/48* (2026.01); *G06V 10/764* (2022.01); *G06V 10/82* (2022.01); *G06V 20/10* (2022.01); *G06V 40/28* (2022.01); *G10L 15/02* (2013.01); *G10L 15/063* (2013.01); *G10L 15/07* (2013.01); *G10L 15/16* (2013.01); *G10L 15/1815* (2013.01); *G10L 15/1822* (2013.01); *G10L 15/183* (2013.01); *G10L 15/187* (2013.01); *G10L 15/22* (2013.01); *G10L 15/26* (2013.01); *G10L 17/06* (2013.01); *G10L 17/22* (2013.01); *H04L 5/02* (2013.01); *H04L 12/2816* (2013.01); *H04L 41/20* (2013.01); *H04L 41/22* (2013.01); *H04L 43/0882* (2013.01); *H04L 43/0894* (2013.01); *H04L 51/02* (2013.01); *H04L 51/18* (2013.01); *H04L 51/216* (2022.05); *H04L 51/52* (2022.05); *H04L 67/306* (2013.01); *H04L 67/535* (2022.05); *H04L 67/5651* (2022.05); *H04L 67/75* (2022.05); *H04W 12/08* (2013.01); *G06F 2216/13* (2013.01); *G10L 13/00* (2013.01); *G10L 13/04* (2013.01); *G10L 2015/223* (2013.01); *G10L 2015/225* (2013.01); *H04L 51/046* (2013.01); *H04L 67/10* (2013.01); *H04L 67/53* (2022.05)

(58) Field of Classification Search

CPC ............. G06F 16/338; G06F 16/90332; G06F 16/9038; G06F 16/904; G06F 16/9532; G06F 16/9535; G06F 3/011; G06F 3/017; G06F 3/0237; G06F 3/167; G06F 40/274;

G06F 40/30; G06F 40/40; G06F 8/31; G06F 9/44505; G06F 9/4451; G06F 9/453; G06K 9/00355; G06K 9/00664; G06K 9/6269; G06K 9/6273; G06N 20/00; G06N 3/006; G06N 3/0454; G06N 3/08; G06N 5/022; G06N 5/027; G06Q 10/00; G06Q 50/01; G10L 13/00; G10L 13/043; G10L 15/063; G10L 15/16; G10L 15/1815; G10L 15/1822; G10L 15/183; G10L 15/22; G10L 15/26; G10L 17/00; G10L 2015/223; H04L 51/02; H04L 51/046; H04L 51/20; H04L 51/32; H04L 67/10; H04L 67/20; H04L 67/22; H04L 67/306

See application file for complete search history.

(56) References Cited

U.S. PATENT DOCUMENTS

| | | | | |
|---|---|---|---|---|
| 5,872,850 | A | 2/1999 | Klein et al. | |
| 6,026,424 | A | 2/2000 | Circenis | |
| 6,115,458 | A | 9/2000 | Taskett | |
| 6,233,575 | B1 | 5/2001 | Agrawal et al. | |
| 6,243,761 | B1 | 6/2001 | Mogul et al. | |
| 6,345,111 | B1 | 2/2002 | Yamaguchi et al. | |
| 6,484,136 | B1 | 11/2002 | Kanevsky et al. | |
| 6,510,451 | B2 | 1/2003 | Wu et al. | |
| 6,578,025 | B1 | 6/2003 | Pollack et al. | |
| 6,665,640 | B1 | 12/2003 | Bennett et al. | |
| 6,901,364 | B2 | 5/2005 | Nguyen et al. | |
| 6,968,333 | B2 | 11/2005 | Abbott et al. | |
| 6,990,513 | B2 | 1/2006 | Belfiore et al. | |
| 7,069,215 | B1 * | 6/2006 | Bangalore | G10L 15/24 382/187 |
| 7,080,004 | B2 | 7/2006 | Wang et al. | |
| 7,124,123 | B1 | 10/2006 | Roskind et al. | |
| 7,158,678 | B2 | 1/2007 | Nagel et al. | |
| 7,397,912 | B2 | 7/2008 | Aasman et al. | |
| 7,406,408 | B1 | 7/2008 | Lackey et al. | |
| 7,426,537 | B2 | 9/2008 | Lee et al. | |
| 7,467,087 | B1 | 12/2008 | Gillick et al. | |
| 7,624,007 | B2 | 11/2009 | Bennett | |
| 7,702,508 | B2 | 4/2010 | Bennett | |
| 8,019,748 | B1 | 9/2011 | Wu et al. | |
| 8,027,451 | B2 | 9/2011 | Arendsen et al. | |
| 8,112,275 | B2 | 2/2012 | Kennewick et al. | |
| 8,190,627 | B2 | 5/2012 | Platt et al. | |
| 8,195,468 | B2 | 6/2012 | Weider et al. | |
| 8,370,162 | B2 | 2/2013 | Faisman et al. | |
| 8,396,282 | B1 | 3/2013 | Huber et al. | |
| 8,478,581 | B2 | 7/2013 | Chen | |
| 8,504,349 | B2 | 8/2013 | Manu et al. | |
| 8,560,564 | B1 | 10/2013 | Hoelzle et al. | |
| 8,601,019 | B1 | 12/2013 | Weininger et al. | |
| 8,619,767 | B2 | 12/2013 | Ohashi | |
| 8,677,377 | B2 | 3/2014 | Cheyer et al. | |
| 8,713,042 | B1 | 4/2014 | Zinenko et al. | |
| 8,817,951 | B2 | 8/2014 | Goffin et al. | |
| 8,868,592 | B1 | 10/2014 | Weininger et al. | |
| 8,935,192 | B1 | 1/2015 | Ventilla et al. | |
| 8,938,394 | B1 | 1/2015 | Faaborg et al. | |
| 8,949,250 | B1 | 2/2015 | Garg et al. | |
| 8,983,383 | B1 | 3/2015 | Haskin | |
| 8,995,981 | B1 | 3/2015 | Aginsky et al. | |
| 9,026,145 | B1 | 5/2015 | Duleba et al. | |
| 9,098,575 | B2 | 8/2015 | Ilyas et al. | |
| 9,154,739 | B1 | 10/2015 | Nicolaou et al. | |
| 9,171,341 | B1 | 10/2015 | Trandal et al. | |
| 9,177,291 | B2 | 11/2015 | Martinazzi et al. | |
| 9,195,436 | B2 | 11/2015 | Mytkowicz et al. | |
| 9,251,471 | B2 | 2/2016 | Pinckney et al. | |
| 9,299,059 | B1 | 3/2016 | Marra et al. | |
| 9,304,736 | B1 | 4/2016 | Whiteley et al. | |
| 9,338,242 | B1 | 5/2016 | Suchland et al. | |
| 9,338,493 | B2 | 5/2016 | Van Os et al. | |
| 9,344,338 | B2 | 5/2016 | Quillen et al. | |
| 9,354,709 | B1 | 5/2016 | Heller et al. | |
| 9,367,806 | B1 | 6/2016 | Cosic | |
| 9,390,724 | B2 | 7/2016 | List | |
| 9,406,103 | B1 | 8/2016 | Gray et al. | |
| 9,418,658 | B1 | 8/2016 | David et al. | |
| 9,424,840 | B1 * | 8/2016 | Hart | G10L 15/00 |
| 9,443,527 | B1 | 9/2016 | Watanabe et al. | |
| 9,472,206 | B2 | 10/2016 | Ady | |
| 9,479,931 | B2 | 10/2016 | Ortiz, Jr. et al. | |
| 9,507,417 | B2 | 11/2016 | Dal Mutto et al. | |
| 9,508,341 | B1 | 11/2016 | Parlikar et al. | |
| 9,536,522 | B1 | 1/2017 | Hall et al. | |
| 9,576,574 | B2 | 2/2017 | Van Os | |
| 9,639,608 | B2 | 5/2017 | Freeman | |
| 9,659,577 | B1 | 5/2017 | Langhammer | |
| 9,660,950 | B2 | 5/2017 | Archibong et al. | |
| 9,686,577 | B2 | 6/2017 | Tseng et al. | |
| 9,720,955 | B1 | 8/2017 | Cao et al. | |
| 9,747,895 | B1 | 8/2017 | Jansche et al. | |
| 9,767,309 | B1 | 9/2017 | Patel et al. | |
| 9,785,717 | B1 | 10/2017 | Deluca | |
| 9,792,281 | B2 | 10/2017 | Sarikaya | |
| 9,824,321 | B2 | 11/2017 | Raghunathan et al. | |
| 9,858,925 | B2 | 1/2018 | Gruber et al. | |
| 9,865,260 | B1 | 1/2018 | Vuskovic et al. | |
| 9,875,233 | B1 | 1/2018 | Tomkins et al. | |
| 9,875,741 | B2 | 1/2018 | Gelfenbeyn et al. | |
| 9,881,077 | B1 | 1/2018 | Alfonseca et al. | |
| 9,886,953 | B2 | 2/2018 | Lemay et al. | |
| 9,916,753 | B2 | 3/2018 | Aginsky et al. | |
| 9,959,328 | B2 | 5/2018 | Jain et al. | |
| 9,986,394 | B1 | 5/2018 | Taylor et al. | |
| 9,990,591 | B2 | 6/2018 | Gelfenbeyn et al. | |
| 10,042,032 | B2 | 8/2018 | Scott et al. | |
| 10,088,908 | B1 | 10/2018 | Poupyrev et al. | |
| 10,108,707 | B1 | 10/2018 | Chu et al. | |
| 10,109,273 | B1 | 10/2018 | Rajasekaram et al. | |
| 10,127,220 | B2 | 11/2018 | Bellegarda et al. | |
| 10,127,227 | B1 | 11/2018 | Badr et al. | |
| 10,133,613 | B2 | 11/2018 | Surti et al. | |
| 10,134,388 | B1 | 11/2018 | Lilly | |
| 10,134,395 | B2 | 11/2018 | Typrin | |
| 10,162,886 | B2 | 12/2018 | Wang et al. | |
| 10,199,051 | B2 | 2/2019 | Binder et al. | |
| 10,220,303 | B1 | 3/2019 | Schmidt et al. | |
| 10,229,680 | B1 * | 3/2019 | Gillespie | G06F 40/295 |
| 10,241,752 | B2 | 3/2019 | Lemay et al. | |
| 10,255,365 | B2 | 4/2019 | Campbell et al. | |
| 10,262,062 | B2 | 4/2019 | Chang et al. | |
| 10,276,170 | B2 | 4/2019 | Gruber et al. | |
| 10,336,856 | B2 | 7/2019 | Stache et al. | |
| 10,348,658 | B2 | 7/2019 | Rodriguez et al. | |
| 10,354,307 | B2 | 7/2019 | Ye et al. | |
| 10,387,464 | B2 | 8/2019 | Weston et al. | |
| 10,409,818 | B1 | 9/2019 | Hayes et al. | |
| 10,412,026 | B2 | 9/2019 | Sherrets et al. | |
| 10,418,032 | B1 | 9/2019 | Mohajer et al. | |
| 10,462,422 | B1 | 10/2019 | Harrison et al. | |
| 10,467,282 | B2 | 11/2019 | Shorman et al. | |
| 10,482,182 | B1 | 11/2019 | Jankowski, Jr. | |
| D868,793 | S | 12/2019 | Germe | |
| 10,504,513 | B1 | 12/2019 | Gray et al. | |
| 10,511,808 | B2 | 12/2019 | Harrison et al. | |
| 10,515,625 | B1 | 12/2019 | Metallinou et al. | |
| 10,574,613 | B2 | 2/2020 | Leiba et al. | |
| 10,579,688 | B2 | 3/2020 | Green | |
| 10,594,757 | B1 | 3/2020 | Shevchenko et al. | |
| 10,600,406 | B1 | 3/2020 | Shapiro et al. | |
| D881,883 | S | 4/2020 | Germe | |
| D882,567 | S | 4/2020 | Parfitt | |
| D882,570 | S | 4/2020 | Germe | |
| 10,649,985 | B1 | 5/2020 | Cornell, Jr. et al. | |
| 10,679,008 | B2 | 6/2020 | Dubey et al. | |
| 10,719,786 | B1 | 7/2020 | Treseler et al. | |
| 10,761,866 | B2 | 9/2020 | Liu et al. | |
| 10,762,903 | B1 | 9/2020 | Kahan et al. | |
| 10,782,986 | B2 | 9/2020 | Martin | |
| 10,803,050 | B1 | 10/2020 | Salkola | |

(56) References Cited

U.S. PATENT DOCUMENTS 10,810,256 B1 10/2020 Goldberg et al.
10,827,024 B1 11/2020 Schissel et al.
10,839,098 B2 11/2020 Borup et al.
10,841,249 B2 11/2020 Lim et al.
10,854,206 B1 12/2020 Liu et al.
10,855,485 B1 12/2020 Zhou et al.
10,867,256 B2 12/2020 Bugay et al.
10,878,337 B2 12/2020 Katsuki et al.
10,896,295 B1 1/2021 Shenoy
10,936,346 B2 3/2021 Natarajan et al.
10,949,616 B1 3/2021 Shenoy et al.
10,957,329 B1 3/2021 Liu et al.
10,958,599 B1 3/2021 Penov et al.
10,963,273 B2 3/2021 Peng et al.
10,977,258 B1 4/2021 Liu et al.
10,977,711 B1 4/2021 Verma et al.
10,978,056 B1 4/2021 Challa et al.
11,003,669 B1 5/2021 Nelson et al.
11,009,961 B2 5/2021 Moscarillo
11,010,436 B1 5/2021 Peng et al.
11,038,974 B1 6/2021 Koukoumidis et al.
11,042,554 B1 6/2021 Balakrishnan et al.
11,068,659 B2 7/2021 Cutting et al.
11,086,858 B1 8/2021 Koukoumidis et al.
11,087,756 B1 8/2021 Presant et al.
11,093,551 B1 8/2021 Natarajan et al.
11,100,179 B1 8/2021 Zhou et al.
11,115,410 B1 9/2021 Hanson et al.
11,120,158 B2 9/2021 Hockey et al.
11,159,767 B1 10/2021 Kamisetty et al.
11,245,646 B1 2/2022 Koukoumidis et al.
11,301,521 B1 4/2022 Schissel et al.
11,334,165 B1 5/2022 Clements
11,341,335 B1 5/2022 Crook et al.
11,368,420 B1 6/2022 Crook et al.
11,436,300 B1 9/2022 Felt et al.
11,442,992 B1 9/2022 Moon et al.
11,443,358 B2 9/2022 Chow
11,562,744 B1 1/2023 Gao et al.
11,563,706 B2 1/2023 Greenberg et al.
11,567,788 B1 1/2023 Khemka et al.
11,636,438 B1 4/2023 Huang et al.
11,658,835 B2 5/2023 Behar
11,694,281 B1 7/2023 Liu et al.
11,715,042 B1 8/2023 Liu et al.
11,727,677 B2 * 8/2023 Liu ........................ G06Q 10/00 345/156
11,809,480 B1 11/2023 Cheng et al.
11,861,315 B2 1/2024 Sethi et al.
11,861,674 B1 1/2024 Huang et al.
11,948,563 B1 4/2024 Liu et al.
11,966,701 B2 4/2024 Pu et al.
12,019,685 B1 6/2024 Liu et al.
12,118,790 B2 10/2024 Wang et al.
12,125,297 B2 10/2024 Santoro et al.
12,198,430 B1 1/2025 Kottur
2001/0036297 A1 11/2001 Ikegami et al.
2002/0015480 A1 2/2002 Daswani et al.
2002/0111917 A1 8/2002 Hoffman et al.
2002/0141621 A1 10/2002 Lane
2002/0152067 A1 10/2002 Viikki et al.
2002/0165912 A1 11/2002 Wenocur et al.
2003/0005174 A1 1/2003 Coffman et al.
2003/0046083 A1 3/2003 Devinney et al.
2003/0126330 A1 7/2003 Balasuriya
2003/0182125 A1 9/2003 Phillips et al.
2003/0220095 A1 11/2003 Engelhart
2004/0019487 A1 1/2004 Kleindienst et al.
2004/0019489 A1 1/2004 Funk et al.
2004/0044516 A1 3/2004 Kennewick et al.
2004/0075690 A1 4/2004 Cirne
2004/0085162 A1 5/2004 Agarwal et al.
2004/0098253 A1 5/2004 Balentine et al.
2004/0186819 A1 9/2004 Baker
2004/0230572 A1 11/2004 Omoigui
2004/0236580 A1 11/2004 Bennett
2005/0004907 A1 1/2005 Bruno et al.
2005/0010393 A1 1/2005 Danieli et al.
2005/0135595 A1 6/2005 Bushey et al.
2005/0144284 A1 6/2005 Ludwig et al.
2005/0149327 A1 7/2005 Roth et al.
2006/0047617 A1 3/2006 Bacioiu et al.
2006/0294546 A1 12/2006 Ro et al.
2007/0028264 A1 2/2007 Lowe
2007/0073678 A1 3/2007 Scott et al.
2007/0073745 A1 3/2007 Scott et al.
2007/0124147 A1 5/2007 Gopinath et al.
2007/0124263 A1 5/2007 Katariya et al.
2007/0136058 A1 6/2007 Jeong et al.
2007/0185712 A1 8/2007 Jeong et al.
2007/0239432 A1 10/2007 Soong et al.
2007/0239454 A1 10/2007 Paek et al.
2007/0270126 A1 11/2007 Forbes et al.
2007/0300224 A1 12/2007 Aggarwal et al.
2008/0015864 A1 1/2008 Ross et al.
2008/0028036 A1 1/2008 Slawson et al.
2008/0095187 A1 4/2008 Jung et al.
2008/0107255 A1 5/2008 Geva et al.
2008/0178126 A1 7/2008 Beeck et al.
2008/0189269 A1 8/2008 Olsen
2008/0209577 A1 8/2008 Vrielink et al.
2008/0222142 A1 9/2008 O'Donnell
2008/0240379 A1 10/2008 Maislos et al.
2008/0243885 A1 10/2008 Harger et al.
2008/0300884 A1 12/2008 Smith
2008/0313162 A1 12/2008 Bahrami et al.
2009/0007127 A1 1/2009 Roberts et al.
2009/0070113 A1 3/2009 Gupta et al.
2009/0119581 A1 5/2009 Velusamy
2009/0150153 A1 6/2009 Li et al.
2009/0150322 A1 6/2009 Bower et al.
2009/0191521 A1 7/2009 Paul et al.
2009/0228439 A1 9/2009 Manolescu et al.
2009/0265299 A1 10/2009 Hadad et al.
2009/0282033 A1 11/2009 Alshawi
2009/0300525 A1 12/2009 Jolliff et al.
2009/0326945 A1 12/2009 Tian
2010/0031143 A1 2/2010 Rao et al.
2010/0064345 A1 3/2010 Bentley et al.
2010/0125456 A1 5/2010 Weng et al.
2010/0138215 A1 6/2010 Williams
2010/0138224 A1 6/2010 Bedingfield, Sr.
2010/0199320 A1 8/2010 Ramanathan et al.
2010/0217794 A1 8/2010 Strandell et al.
2010/0217837 A1 8/2010 Ansari et al.
2010/0241431 A1 9/2010 Weng et al.
2010/0241639 A1 9/2010 Kifer et al.
2010/0299329 A1 11/2010 Emanuel et al.
2010/0306191 A1 12/2010 Lebeau et al.
2010/0306249 A1 12/2010 Hill et al.
2011/0010675 A1 1/2011 Hamilton, II et al.
2011/0040751 A1 2/2011 Chandrasekar et al.
2011/0078615 A1 3/2011 Bier
2011/0093264 A1 4/2011 Gopalakrishnan
2011/0093820 A1 4/2011 Zhang et al.
2011/0119216 A1 5/2011 Wigdor
2011/0137918 A1 6/2011 Yasrebi et al.
2011/0153324 A1 6/2011 Ballinger et al.
2011/0153423 A1 6/2011 Elvekrog et al.
2011/0153863 A1 6/2011 Khan et al.
2011/0161348 A1 6/2011 Oron
2011/0169726 A1 7/2011 Holmdahl et al.
2011/0173204 A1 7/2011 Murillo et al.
2011/0182485 A1 7/2011 Shochat et al.
2011/0184768 A1 7/2011 Norton et al.
2011/0238754 A1 9/2011 Dasilva et al.
2011/0246383 A1 10/2011 Gibson et al.
2011/0264522 A1 10/2011 Chan et al.
2012/0016678 A1 1/2012 Gruber et al.
2012/0019446 A1 1/2012 Wu et al.
2012/0022872 A1 1/2012 Gruber et al.
2012/0023120 A1 1/2012 Kanefsky
2012/0030301 A1 2/2012 Herold et al.
2012/0041907 A1 2/2012 Wang et al.

(56) References Cited

U.S. PATENT DOCUMENTS

| | | | |
|---|---|---|---|
| 2012/0053945 | A1 | 3/2012 | Gupta et al. |
| 2012/0069131 | A1 | 3/2012 | Abelow |
| 2012/0078889 | A1 | 3/2012 | Chu-Carroll et al. |
| 2012/0078891 | A1 | 3/2012 | Brown et al. |
| 2012/0081303 | A1 * | 4/2012 | Cassar .................. G06F 3/0481 345/173 |
| 2012/0101806 | A1 | 4/2012 | Davis et al. |
| 2012/0101865 | A1 | 4/2012 | Zhakov |
| 2012/0105257 | A1 | 5/2012 | Murillo et al. |
| 2012/0109858 | A1 | 5/2012 | Makadia et al. |
| 2012/0117051 | A1 | 5/2012 | Liu et al. |
| 2012/0159507 | A1 | 6/2012 | Kwon et al. |
| 2012/0159635 | A1 | 6/2012 | He et al. |
| 2012/0163224 | A1 | 6/2012 | Long |
| 2012/0179453 | A1 | 7/2012 | Ghani et al. |
| 2012/0179481 | A1 | 7/2012 | Patel et al. |
| 2012/0179633 | A1 | 7/2012 | Ghani et al. |
| 2012/0179694 | A1 | 7/2012 | Sciacca et al. |
| 2012/0190386 | A1 | 7/2012 | Anderson |
| 2012/0205436 | A1 | 8/2012 | Thomas et al. |
| 2012/0232885 | A1 | 9/2012 | Barbosa et al. |
| 2012/0233188 | A1 | 9/2012 | Majumdar |
| 2012/0245944 | A1 | 9/2012 | Gruber et al. |
| 2012/0246191 | A1 | 9/2012 | Xiong |
| 2012/0254188 | A1 | 10/2012 | Koperski et al. |
| 2012/0265787 | A1 | 10/2012 | Hsu et al. |
| 2012/0278164 | A1 | 11/2012 | Spivack et al. |
| 2012/0290526 | A1 | 11/2012 | Gupta et al. |
| 2012/0290950 | A1 | 11/2012 | Rapaport et al. |
| 2012/0294477 | A1 | 11/2012 | Yang et al. |
| 2012/0297294 | A1 | 11/2012 | Scott et al. |
| 2012/0303356 | A1 | 11/2012 | Boyle et al. |
| 2012/0311035 | A1 | 12/2012 | Guha et al. |
| 2012/0311126 | A1 | 12/2012 | Jadallah et al. |
| 2013/0035930 | A1 | 2/2013 | Ferrucci et al. |
| 2013/0046544 | A1 | 2/2013 | Kay et al. |
| 2013/0054631 | A1 | 2/2013 | Govani et al. |
| 2013/0073387 | A1 | 3/2013 | Heath |
| 2013/0073389 | A1 | 3/2013 | Heath |
| 2013/0073400 | A1 | 3/2013 | Heath |
| 2013/0073473 | A1 | 3/2013 | Heath |
| 2013/0096910 | A1 | 4/2013 | Stan et al. |
| 2013/0117832 | A1 | 5/2013 | Gandhi et al. |
| 2013/0124538 | A1 | 5/2013 | Lee et al. |
| 2013/0191250 | A1 | 7/2013 | Bradley et al. |
| 2013/0191416 | A1 | 7/2013 | Lee et al. |
| 2013/0191790 | A1 | 7/2013 | Kawalkar |
| 2013/0194193 | A1 | 8/2013 | Kawalkar |
| 2013/0204813 | A1 | 8/2013 | Master et al. |
| 2013/0204894 | A1 | 8/2013 | Faith et al. |
| 2013/0226892 | A1 | 8/2013 | Ehsani et al. |
| 2013/0234945 | A1 | 9/2013 | Goktekin |
| 2013/0238332 | A1 | 9/2013 | Chen |
| 2013/0246521 | A1 | 9/2013 | Schacht et al. |
| 2013/0254139 | A1 | 9/2013 | Lei |
| 2013/0262752 | A1 | 10/2013 | Talagala et al. |
| 2013/0265218 | A1 | 10/2013 | Moscarillo |
| 2013/0268624 | A1 | 10/2013 | Yagiura |
| 2013/0268839 | A1 | 10/2013 | Lefebvre et al. |
| 2013/0275138 | A1 | 10/2013 | Gruber et al. |
| 2013/0275441 | A1 | 10/2013 | Agrawal et al. |
| 2013/0277564 | A1 | 10/2013 | Teshima et al. |
| 2013/0282811 | A1 | 10/2013 | Lessin et al. |
| 2013/0289999 | A1 | 10/2013 | Hymel |
| 2013/0290205 | A1 | 10/2013 | Bonmassar et al. |
| 2013/0296057 | A1 | 11/2013 | Gagner et al. |
| 2013/0317858 | A1 | 11/2013 | Hasan et al. |
| 2013/0346077 | A1 | 12/2013 | Mengibar et al. |
| 2013/0346877 | A1 | 12/2013 | Borovoy et al. |
| 2014/0012926 | A1 | 1/2014 | Narayanan et al. |
| 2014/0019459 | A1 | 1/2014 | Gradin et al. |
| 2014/0025702 | A1 | 1/2014 | Curtiss et al. |
| 2014/0032659 | A1 | 1/2014 | Marini et al. |
| 2014/0039895 | A1 | 2/2014 | Aravamudan et al. |
| 2014/0074934 | A1 | 3/2014 | Van Hoff et al. |
| 2014/0094307 | A1 | 4/2014 | Doolittle et al. |
| 2014/0104177 | A1 | 4/2014 | Ouyang et al. |
| 2014/0108307 | A1 | 4/2014 | Raghunathan et al. |
| 2014/0108453 | A1 | 4/2014 | Venkataraman et al. |
| 2014/0108562 | A1 | 4/2014 | Panzer |
| 2014/0108989 | A1 | 4/2014 | Bi et al. |
| 2014/0115410 | A1 | 4/2014 | Kealy et al. |
| 2014/0122622 | A1 | 5/2014 | Castera et al. |
| 2014/0129266 | A1 | 5/2014 | Perl et al. |
| 2014/0143879 | A1 | 5/2014 | Milman et al. |
| 2014/0164506 | A1 | 6/2014 | Tesch et al. |
| 2014/0176603 | A1 | 6/2014 | Kumar et al. |
| 2014/0195371 | A1 | 7/2014 | Kageyama et al. |
| 2014/0207860 | A1 | 7/2014 | Wang et al. |
| 2014/0214410 | A1 | 7/2014 | Jang et al. |
| 2014/0222415 | A1 | 8/2014 | Legat |
| 2014/0222422 | A1 | 8/2014 | Sarikaya et al. |
| 2014/0236591 | A1 | 8/2014 | Yue et al. |
| 2014/0244712 | A1 | 8/2014 | Walters et al. |
| 2014/0255887 | A1 | 9/2014 | Xu et al. |
| 2014/0258191 | A1 | 9/2014 | Gubin et al. |
| 2014/0278786 | A1 | 9/2014 | Liu-Qiu-Yan |
| 2014/0280001 | A1 | 9/2014 | Stein |
| 2014/0280017 | A1 | 9/2014 | Indarapu et al. |
| 2014/0282153 | A1 | 9/2014 | Christiansen et al. |
| 2014/0282276 | A1 | 9/2014 | Drucker et al. |
| 2014/0282956 | A1 | 9/2014 | Kennedy et al. |
| 2014/0297284 | A1 | 10/2014 | Gruber et al. |
| 2014/0310470 | A1 | 10/2014 | Rash et al. |
| 2014/0310614 | A1 | 10/2014 | Jones |
| 2014/0310788 | A1 | 10/2014 | Ricci |
| 2014/0314283 | A1 | 10/2014 | Harding |
| 2014/0330832 | A1 | 11/2014 | Viau |
| 2014/0354539 | A1 | 12/2014 | Skogöet al. |
| 2014/0358539 | A1 | 12/2014 | Rao et al. |
| 2014/0358843 | A1 | 12/2014 | Subramaniam et al. |
| 2014/0358890 | A1 | 12/2014 | Chen et al. |
| 2014/0365209 | A1 * | 12/2014 | Evermann ............... G06F 40/35 704/9 |
| 2014/0365216 | A1 | 12/2014 | Gruber et al. |
| 2014/0365919 | A1 | 12/2014 | Shaw et al. |
| 2014/0379340 | A1 | 12/2014 | Timem et al. |
| 2015/0006286 | A1 | 1/2015 | Liu et al. |
| 2015/0012345 | A1 | 1/2015 | Bhagat et al. |
| 2015/0012524 | A1 | 1/2015 | Heymans et al. |
| 2015/0019227 | A1 | 1/2015 | Anandarajah |
| 2015/0032504 | A1 | 1/2015 | Elango et al. |
| 2015/0046841 | A1 | 2/2015 | Sharon et al. |
| 2015/0058720 | A1 | 2/2015 | Smadja et al. |
| 2015/0067502 | A1 | 3/2015 | Yang et al. |
| 2015/0073907 | A1 * | 3/2015 | Purves ................. G06Q 20/384 705/14.58 |
| 2015/0078613 | A1 | 3/2015 | Forutanpour et al. |
| 2015/0079554 | A1 | 3/2015 | Lee et al. |
| 2015/0081321 | A1 | 3/2015 | Jain |
| 2015/0081674 | A1 | 3/2015 | Ali et al. |
| 2015/0082229 | A1 | 3/2015 | Ouyang et al. |
| 2015/0088665 | A1 | 3/2015 | Karlsson |
| 2015/0095033 | A1 | 4/2015 | Boies et al. |
| 2015/0100524 | A1 | 4/2015 | Pantel et al. |
| 2015/0142420 | A1 | 5/2015 | Sarikaya et al. |
| 2015/0142447 | A1 | 5/2015 | Kennewick et al. |
| 2015/0142704 | A1 | 5/2015 | London |
| 2015/0149182 | A1 | 5/2015 | Kalns et al. |
| 2015/0154001 | A1 | 6/2015 | Knox et al. |
| 2015/0169284 | A1 | 6/2015 | Quast et al. |
| 2015/0169744 | A1 | 6/2015 | Walkingshaw et al. |
| 2015/0170050 | A1 | 6/2015 | Price |
| 2015/0179168 | A1 | 6/2015 | Hakkani-Tur et al. |
| 2015/0185827 | A1 | 7/2015 | Sayed |
| 2015/0186156 | A1 | 7/2015 | Brown et al. |
| 2015/0199333 | A1 | 7/2015 | Nekhay |
| 2015/0199715 | A1 | 7/2015 | Caron et al. |
| 2015/0207765 | A1 | 7/2015 | Brantingham et al. |
| 2015/0220777 | A1 | 8/2015 | Kauffmann et al. |
| 2015/0220888 | A1 | 8/2015 | Iyer |
| 2015/0227519 | A1 | 8/2015 | Clark et al. |
| 2015/0228275 | A1 | 8/2015 | Watanabe et al. |
| 2015/0242525 | A1 | 8/2015 | Perlegos |

(56) References Cited

U.S. PATENT DOCUMENTS

2015/0242787 A1 8/2015 Bernstein et al.
2015/0248476 A1 9/2015 Weissinger et al.
2015/0256636 A1 9/2015 Spivack et al.
2015/0278691 A1 10/2015 Xia et al.
2015/0278922 A1 10/2015 Isaacson et al.
2015/0279389 A1 10/2015 Lebeau et al.
2015/0286709 A1* 10/2015 Sathish .................. G06Q 10/06 706/45
2015/0286747 A1 10/2015 Anastasakos et al.
2015/0293597 A1 10/2015 Mishra et al.
2015/0293602 A1 10/2015 Kay et al.
2015/0293995 A1 10/2015 Chen et al.
2015/0317302 A1 11/2015 Liu et al.
2015/0331853 A1 11/2015 Palmonari et al.
2015/0332670 A1 11/2015 Akbacak et al.
2015/0332672 A1 11/2015 Akbacak et al.
2015/0339303 A1 11/2015 Perlegos
2015/0347375 A1 12/2015 Tremblay et al.
2015/0347572 A1 12/2015 Yang et al.
2015/0348543 A1 12/2015 Zhao et al.
2015/0348551 A1 12/2015 Gruber et al.
2015/0356784 A1 12/2015 Miller et al.
2015/0363393 A1 12/2015 Williams et al.
2015/0370798 A1 12/2015 Ju et al.
2015/0373565 A1 12/2015 Safavi
2015/0379426 A1 12/2015 Steele et al.
2015/0379568 A1 12/2015 Balasubramanian et al.
2015/0379981 A1 12/2015 Balasubramanian et al.
2016/0004862 A1 1/2016 Almehmadi et al.
2016/0019290 A1 1/2016 Ratnaparkhi et al.
2016/0021179 A1 1/2016 James et al.
2016/0026720 A1 1/2016 Lehrer et al.
2016/0037311 A1 2/2016 Cho
2016/0042069 A1 2/2016 Lee-Goldman et al.
2016/0042249 A1 2/2016 Babenko et al.
2016/0048527 A1 2/2016 Li
2016/0063553 A1 3/2016 Pesochinsky
2016/0070449 A1 3/2016 Christiansen et al.
2016/0080485 A1 3/2016 Hamedi
2016/0092160 A1 3/2016 Graff et al.
2016/0092598 A1 3/2016 Mishra
2016/0093298 A1 3/2016 Naik et al.
2016/0093304 A1 3/2016 Kim et al.
2016/0098482 A1 4/2016 Moon et al.
2016/0110381 A1 4/2016 Chen et al.
2016/0116995 A1 4/2016 Wilson et al.
2016/0117360 A1 4/2016 Kunc et al.
2016/0156574 A1 6/2016 Hum et al.
2016/0156584 A1 6/2016 Hum et al.
2016/0163311 A1 6/2016 Crook et al.
2016/0170989 A1 6/2016 Bishop et al.
2016/0173568 A1 6/2016 Penilla et al.
2016/0173578 A1 6/2016 Sharma et al.
2016/0188565 A1 6/2016 Robichaud et al.
2016/0188671 A1 6/2016 Gupta et al.
2016/0188727 A1 6/2016 Waibel et al.
2016/0188730 A1 6/2016 Delli Santi et al.
2016/0196491 A1 7/2016 Chandrasekaran et al.
2016/0203002 A1 7/2016 Kannan et al.
2016/0203238 A1 7/2016 Cherniavskii et al.
2016/0210363 A1 7/2016 Rambhia et al.
2016/0210963 A1 7/2016 Kim et al.
2016/0217124 A1 7/2016 Sarikaya et al.
2016/0219078 A1* 7/2016 Porras .................. G06F 3/0484
2016/0225370 A1 8/2016 Kannan et al.
2016/0239751 A1 8/2016 Mosterman et al.
2016/0253630 A1 9/2016 Oliveri et al.
2016/0255082 A1 9/2016 Rathod
2016/0259717 A1 9/2016 Nychis et al.
2016/0261545 A1 9/2016 Bastide et al.
2016/0269472 A1 9/2016 Byron et al.
2016/0283016 A1 9/2016 Zaitsev et al.
2016/0292582 A1 10/2016 Kozloski et al.
2016/0306505 A1 10/2016 Vigneras et al.
2016/0307571 A1 10/2016 Mizumoto et al.
2016/0308799 A1 10/2016 Schubert et al.
2016/0320853 A1 11/2016 Lien et al.
2016/0328096 A1 11/2016 Tran et al.
2016/0336006 A1* 11/2016 Levit ..................... G10L 15/063
2016/0336008 A1 11/2016 Menezes et al.
2016/0371054 A1 12/2016 Beaumont et al.
2016/0371378 A1 12/2016 Fan et al.
2016/0372116 A1 12/2016 Summerfield
2016/0378849 A1 12/2016 Myslinski
2016/0378861 A1 12/2016 Eledath et al.
2016/0379213 A1 12/2016 Isaacson et al.
2016/0381220 A1 12/2016 Kurganov
2017/0005803 A1 1/2017 Brownewell et al.
2017/0019362 A1 1/2017 Kim et al.
2017/0025117 A1 1/2017 Hong
2017/0026318 A1 1/2017 Daniel et al.
2017/0034112 A1 2/2017 Perlegos
2017/0061956 A1 3/2017 Sarikaya et al.
2017/0063887 A1 3/2017 Muddu et al.
2017/0078621 A1 3/2017 Sahay et al.
2017/0091168 A1 3/2017 Bellegarda et al.
2017/0091171 A1 3/2017 Perez
2017/0092008 A1 3/2017 Djorgovski et al.
2017/0092264 A1 3/2017 Hakkani-Tur et al.
2017/0098236 A1 4/2017 Lee et al.
2017/0125012 A1 5/2017 Kanthak et al.
2017/0132019 A1 5/2017 Karashchuk et al.
2017/0132688 A1 5/2017 Freund et al.
2017/0139938 A1 5/2017 Balasubramanian et al.
2017/0147582 A1 5/2017 Michels et al.
2017/0147676 A1 5/2017 Jaidka et al.
2017/0147696 A1 5/2017 Evnine
2017/0148073 A1 5/2017 Nomula et al.
2017/0161018 A1 6/2017 Lemay et al.
2017/0169013 A1 6/2017 Sarikaya et al.
2017/0169354 A1 6/2017 Diamanti et al.
2017/0178626 A1 6/2017 Gruber et al.
2017/0180276 A1 6/2017 Gershony et al.
2017/0185375 A1 6/2017 Martel et al.
2017/0188101 A1 6/2017 Srinivasaraghavan
2017/0193390 A1 7/2017 Weston et al.
2017/0206271 A1 7/2017 Jain
2017/0206405 A1* 7/2017 Molchanov ............ G06N 3/084
2017/0220426 A1 8/2017 Sankar et al.
2017/0221475 A1 8/2017 Bruguier et al.
2017/0228240 A1 8/2017 Khan et al.
2017/0228366 A1 8/2017 Bui et al.
2017/0235360 A1 8/2017 George-Svahn
2017/0235726 A1 8/2017 Wang et al.
2017/0235740 A1 8/2017 Seth et al.
2017/0235848 A1 8/2017 Van Dusen et al.
2017/0242847 A1 8/2017 Li et al.
2017/0243107 A1 8/2017 Jolley et al.
2017/0244774 A1 8/2017 Trombetta et al.
2017/0249059 A1 8/2017 Houseworth
2017/0255272 A1 9/2017 Flagg et al.
2017/0255536 A1 9/2017 Weissinger et al.
2017/0255580 A1 9/2017 Parekh et al.
2017/0263242 A1 9/2017 Nagao
2017/0270180 A1 9/2017 State
2017/0270919 A1 9/2017 Parthasarathi et al.
2017/0270929 A1 9/2017 Aleksic et al.
2017/0278514 A1 9/2017 Mathias et al.
2017/0286401 A1 10/2017 He et al.
2017/0287474 A1 10/2017 Maergner et al.
2017/0290077 A1 10/2017 Nilsson et al.
2017/0293834 A1 10/2017 Raison et al.
2017/0295114 A1 10/2017 Goldberg et al.
2017/0308589 A1 10/2017 Liu et al.
2017/0316159 A1 11/2017 Hooker
2017/0344645 A1 11/2017 Appel et al.
2017/0351786 A1 12/2017 Quattoni et al.
2017/0351969 A1 12/2017 Parmar et al.
2017/0353469 A1 12/2017 Selekman et al.
2017/0357637 A1 12/2017 Nell et al.
2017/0357661 A1 12/2017 Hornkvist et al.
2017/0358293 A1 12/2017 Chua et al.
2017/0358304 A1 12/2017 Castillo Sanchez et al.
2017/0359707 A1 12/2017 Diaconu et al.

(56) References Cited

U.S. PATENT DOCUMENTS

2017/0364563 A1 12/2017 Gao et al.
2017/0366479 A1 12/2017 Ladha et al.
2017/0373999 A1 12/2017 Abou Mahmoud et al.
2018/0013699 A1 1/2018 Sapoznik et al.
2018/0018562 A1 1/2018 Jung
2018/0018987 A1 1/2018 Zass
2018/0020285 A1 1/2018 Zass
2018/0040020 A1 2/2018 Kurian et al.
2018/0047091 A1 2/2018 Ogden et al.
2018/0052824 A1 2/2018 Ferrydiansyah et al.
2018/0052842 A1 2/2018 Hewavitharana et al.
2018/0054523 A1 2/2018 Zhang et al.
2018/0060029 A1 3/2018 Kogan et al.
2018/0060439 A1 3/2018 Kula et al.
2018/0061401 A1 3/2018 Sarikaya et al.
2018/0061419 A1 3/2018 Melendo Casado et al.
2018/0062862 A1 3/2018 Lu et al.
2018/0067638 A1 3/2018 Klein et al.
2018/0068019 A1 3/2018 Novikoff et al.
2018/0068661 A1 3/2018 Printz
2018/0075844 A1 3/2018 Kim et al.
2018/0075847 A1 3/2018 Lee et al.
2018/0082191 A1 3/2018 Pearmain et al.
2018/0083894 A1 3/2018 Fung et al.
2018/0088663 A1* 3/2018 Zhang .................. G06V 40/113
2018/0088677 A1* 3/2018 Zhang .................. G06T 19/006
2018/0089164 A1 3/2018 Iida et al.
2018/0089541 A1 3/2018 Stoop et al.
2018/0096072 A1 4/2018 He et al.
2018/0101893 A1 4/2018 Dagan et al.
2018/0107917 A1 4/2018 Hewavitharana et al.
2018/0108358 A1 4/2018 Humphreys et al.
2018/0115598 A1 4/2018 Shariat et al.
2018/0121508 A1 5/2018 Halstvedt
2018/0130194 A1 5/2018 Kochura et al.
2018/0146019 A1 5/2018 Chen et al.
2018/0150233 A1 5/2018 Hanzawa et al.
2018/0150280 A1 5/2018 Rhee et al.
2018/0150739 A1 5/2018 Wu
2018/0157759 A1 6/2018 Zheng et al.
2018/0157981 A1 6/2018 Albertson et al.
2018/0165723 A1 6/2018 Wright et al.
2018/0176614 A1 6/2018 Lin et al.
2018/0189628 A1 7/2018 Kaufmann et al.
2018/0189629 A1 7/2018 Yatziv et al.
2018/0196854 A1 7/2018 Burks
2018/0210874 A1 7/2018 Fuxman et al.
2018/0218428 A1 8/2018 Xie et al.
2018/0232435 A1 8/2018 Papangelis et al.
2018/0232662 A1 8/2018 Solomon et al.
2018/0233139 A1 8/2018 Finkelstein et al.
2018/0233141 A1 8/2018 Solomon et al.
2018/0239837 A1 8/2018 Wang
2018/0240014 A1 8/2018 Strope et al.
2018/0246953 A1 8/2018 Oh et al.
2018/0246983 A1 8/2018 Rathod
2018/0260086 A1 9/2018 Leme et al.
2018/0260481 A1 9/2018 Rathod
2018/0260680 A1 9/2018 Finkelstein et al.
2018/0260856 A1 9/2018 Balasubramanian et al.
2018/0268298 A1 9/2018 Johansen et al.
2018/0287968 A1 10/2018 Koukoumidis et al.
2018/0293221 A1 10/2018 Finkelstein et al.
2018/0293484 A1 10/2018 Wang et al.
2018/0300040 A1 10/2018 Mate et al.
2018/0301151 A1 10/2018 Mont-Reynaud et al.
2018/0309779 A1 10/2018 Benyo et al.
2018/0329512 A1* 11/2018 Liao ........................ G06F 3/012
2018/0329982 A1 11/2018 Patel et al.
2018/0329998 A1 11/2018 Thomson et al.
2018/0330280 A1 11/2018 Erenrich et al.
2018/0330714 A1 11/2018 Paulik et al.
2018/0330721 A1 11/2018 Thomson et al.
2018/0330737 A1 11/2018 Paulik et al.
2018/0332118 A1 11/2018 Phipps et al.
2018/0341871 A1 11/2018 Maitra et al.
2018/0349962 A1 12/2018 Adderly et al.
2018/0350144 A1 12/2018 Rathod
2018/0350377 A1 12/2018 Karazoun
2018/0367483 A1 12/2018 Rodriguez et al.
2019/0005024 A1 1/2019 Somech et al.
2019/0005549 A1 1/2019 Goldshtein et al.
2019/0007208 A1 1/2019 Surla et al.
2019/0034406 A1 1/2019 Singh et al.
2019/0034849 A1 1/2019 Romaine et al.
2019/0035390 A1 1/2019 Howard et al.
2019/0051289 A1 2/2019 Yoneda et al.
2019/0065588 A1 2/2019 Lin et al.
2019/0073363 A1 3/2019 Perez et al.
2019/0080698 A1 3/2019 Miller
2019/0082221 A1 3/2019 Jain et al.
2019/0087491 A1 3/2019 Bax
2019/0095500 A1 3/2019 Pandey et al.
2019/0095785 A1 3/2019 Sarkar et al.
2019/0115008 A1 4/2019 Jiang et al.
2019/0121907 A1 4/2019 Brunn et al.
2019/0132265 A1 5/2019 Nowak-Przygodzki et al.
2019/0139150 A1 5/2019 Brownhill et al.
2019/0146647 A1 5/2019 Ramchandran et al.
2019/0147849 A1 5/2019 Talwar et al.
2019/0149489 A1 5/2019 Akbulut et al.
2019/0156204 A1* 5/2019 Bresch ................... G06N 3/045
2019/0156206 A1 5/2019 Graham et al.
2019/0156210 A1 5/2019 He et al.
2019/0163691 A1 5/2019 Brunet et al.
2019/0171655 A1 6/2019 Psota et al.
2019/0182195 A1 6/2019 Avital et al.
2019/0205368 A1 7/2019 Wang et al.
2019/0205464 A1 7/2019 Zhao et al.
2019/0206401 A1 7/2019 Liu et al.
2019/0206412 A1 7/2019 Li et al.
2019/0213490 A1 7/2019 White et al.
2019/0236167 A1 8/2019 Hu et al.
2019/0237068 A1 8/2019 Canim et al.
2019/0242608 A1 8/2019 Laftchiev et al.
2019/0258710 A1 8/2019 Biyani et al.
2019/0266185 A1 8/2019 Rao et al.
2019/0281001 A1 9/2019 Miller et al.
2019/0287526 A1 9/2019 Ren et al.
2019/0311036 A1 10/2019 Shanmugam et al.
2019/0311301 A1 10/2019 Pyati
2019/0311710 A1 10/2019 Eraslan et al.
2019/0318729 A1 10/2019 Chao et al.
2019/0318735 A1 10/2019 Chao et al.
2019/0324527 A1 10/2019 Presant et al.
2019/0324553 A1 10/2019 Liu et al.
2019/0324780 A1 10/2019 Zhu et al.
2019/0325042 A1 10/2019 Yu et al.
2019/0325864 A1 10/2019 Anders et al.
2019/0327330 A1 10/2019 Natarajan et al.
2019/0327331 A1 10/2019 Natarajan et al.
2019/0332946 A1 10/2019 Han et al.
2019/0341021 A1 11/2019 Shang et al.
2019/0348033 A1 11/2019 Chen et al.
2019/0361408 A1 11/2019 Tokuchi
2019/0385051 A1 12/2019 Wabgaonkar et al.
2020/0012681 A1 1/2020 McInerney et al.
2020/0027443 A1 1/2020 Raux
2020/0035220 A1 1/2020 Liu
2020/0045119 A1 2/2020 Weldemariam et al.
2020/0081736 A1 3/2020 Gopalan et al.
2020/0104427 A1 4/2020 Long et al.
2020/0110928 A1* 4/2020 Al Jazaery ........... G06N 3/0464
2020/0175990 A1 6/2020 Fanty
2020/0184959 A1 6/2020 Yasa et al.
2020/0202171 A1 6/2020 Hughes et al.
2020/0382449 A1 12/2020 Taylor et al.
2020/0388282 A1 12/2020 Secker-Walker et al.
2020/0410012 A1 12/2020 Moon et al.
2021/0004394 A1 1/2021 Garrett et al.
2021/0011967 A1 1/2021 Rathod
2021/0110115 A1 4/2021 Hermann et al.
2021/0117214 A1 4/2021 Presant et al.
2021/0117623 A1 4/2021 Aly et al.

(56) References Cited

U.S. PATENT DOCUMENTS

| | | | | |
|---|---|---|---|---|
| 2021/0117624 | A1 | 4/2021 | Aghajanyan et al. | |
| 2021/0117681 | A1 | 4/2021 | Poddar et al. | |
| 2021/0117712 | A1 | 4/2021 | Huang et al. | |
| 2021/0117780 | A1 | 4/2021 | Malik et al. | |
| 2021/0118440 | A1 | 4/2021 | Peng et al. | |
| 2021/0118442 | A1 | 4/2021 | Poddar et al. | |
| 2021/0119955 | A1 | 4/2021 | Penov et al. | |
| 2021/0120206 | A1 | 4/2021 | Liu et al. | |
| 2021/0281632 | A1 | 9/2021 | Brewer et al. | |
| 2021/0303512 | A1 | 9/2021 | Barday et al. | |
| 2022/0006661 | A1 | 1/2022 | Rathod | |
| 2022/0038615 | A1 | 2/2022 | Chaudhri et al. | |
| 2022/0092131 | A1 | 3/2022 | Koukoumidis et al. | |
| 2022/0129513 | A1 | 4/2022 | Wu | |
| 2022/0129556 | A1 | 4/2022 | Chen et al. | |
| 2022/0188361 | A1* | 6/2022 | Botros | G02B 27/01 |
| 2022/0254338 | A1 | 8/2022 | Gruber et al. | |
| 2022/0284904 | A1 | 9/2022 | Pu et al. | |
| 2022/0358917 | A1 | 11/2022 | Chaland et al. | |
| 2022/0382376 | A1 | 12/2022 | Wang et al. | |
| 2023/0368812 | A1* | 11/2023 | Marchi | G10L 15/197 |
| 2023/0401170 | A1 | 12/2023 | Kottur et al. | |
| 2024/0054156 | A1 | 2/2024 | Vincent et al. | |
| 2024/0095544 | A1 | 3/2024 | Kahn et al. | |
| 2024/0112008 | A1 | 4/2024 | Malik et al. | |
| 2024/0303439 | A1* | 9/2024 | Shaikh | G06F 40/30 |
| 2024/0386015 | A1 | 11/2024 | Crabtree et al. | |

FOREIGN PATENT DOCUMENTS

| | | | |
|---|---|---|---|
| CN | 101375273 | A | 2/2009 |
| CN | 101465749 | A | 6/2009 |
| CN | 101772792 | A | 7/2010 |
| CN | 103262156 | A | 8/2013 |
| CN | 103294195 | A | 9/2013 |
| CN | 103608837 | A | 2/2014 |
| CN | 103703466 | A | 4/2014 |
| CN | 104718765 | A | 6/2015 |
| CN | 104981681 | A | 10/2015 |
| CN | 105830150 | A | 8/2016 |
| CN | 105843801 | A | 8/2016 |
| CN | 105917330 | A | 8/2016 |
| CN | 106055114 | A | 10/2016 |
| CN | 106462909 | A | 2/2017 |
| CN | 106527709 | A | 3/2017 |
| CN | 106997236 | A | 8/2017 |
| CN | 107003723 | A | 8/2017 |
| CN | 107148554 | A | 9/2017 |
| CN | 107210033 | A | 9/2017 |
| CN | 107408324 | A | 11/2017 |
| CN | 107490971 | A | 12/2017 |
| CN | 107633042 | A | 1/2018 |
| CN | 107704559 | A | 2/2018 |
| CN | 107750360 | A | 3/2018 |
| CN | 107909061 | A | 4/2018 |
| CN | 107924552 | A | 4/2018 |
| EP | 2530870 | A1 | 12/2012 |
| EP | 3122001 | A1 | 1/2017 |
| JP | H1173297 | A | 3/1999 |
| JP | 2015095232 | A | 5/2015 |
| JP | 2015191561 | A | 11/2015 |
| JP | 2016151736 | A | 8/2016 |
| KR | 20070043673 | A | 4/2007 |
| KR | 101350712 | B1 | 1/2014 |
| KR | 20170140079 | A | 12/2017 |
| WO | 2012116241 | A2 | 8/2012 |
| WO | 2014190297 | A1 | 11/2014 |
| WO | 2016065020 | A2 | 4/2016 |
| WO | 2016195739 | A1 | 12/2016 |
| WO | 2017053208 | A1 | 3/2017 |
| WO | 2017112003 | A1 | 6/2017 |
| WO | 2017116488 | A1 | 7/2017 |
| WO | 2017129149 | A1 | 8/2017 |
| WO | 2018053502 | A1 | 3/2018 |
| WO | 2018067402 | A1 | 4/2018 |
| WO | 2018235191 | A1 | 12/2018 |

OTHER PUBLICATIONS

US 11,915,021 B1, 02/2024, Liu et al. (withdrawn)

Leung K.W-T., et al., "Deriving Concept-Based User Profiles from Search Engine Logs," IEEE Transactions on Knowledge and Data Engineering, Jul. 2010, vol. 22 (7), pp. 969-982.

Li; et al., "A Persona-based Neural Conversation Model," arXiv preprint arXiv: 1603.06155, Jun. 8, 2016, 10 Pages.

Li T., et al., "Ease.ml: Towards Multi-tenant Resource Sharing for Machine Learning Workloads," arXiv: 1708.07308v1, Aug. 24, 2017, pp. 1-17.

Liebman E., et al., "DJ-MC: A Reinforcement-Learning Agent for Music Playlist Recommendation," ArXiv, Mar. 25, 2015, pp. 1-9.

Light M., et al., "Personalized Multimedia Information Access," Communications of the Association for Computing Machinery, May 2002, vol. 45 (5), pp. 54-59.

Liu S., "User Intention oriented Social Image Retrieval," Apr. 2016, 102 pages. [Cover page and Abstract only in English translation].

Mahajan D., et al., "LogUCB: An Explore-Exploit Algorithm for Comments Recommendation," Proceedings of the 21st ACM International Conference on Information and Knowledge Management (CIKM '12), Oct. 2012, pp. 6-15.

Mccross T., "Dialog Management," Feb. 15, 2018 [Retrieved on Jun. 14, 2019], 12 Pages, Retrieved from Internet: https://tutorials.botsfloor.com/dialog-management-799c20a39aad.

Mcinerney J., et al., "Explore, Exploit, and Explain: Personalizing Explainable Recommendations with Bandits," RecSys '18: Proceedings of the 12th ACM Conference on Recommender Systems, Sep. 2018, vol. 12, pp. 31-39.

Mesnil G., et al., "Using Recurrent Neural Networks for Slot Filling in Spoken Language Understanding," IEEE/ACM Transactions on Audio, Speech, and Language Processing, Mar. 2015, vol. 23 (3), pp. 530-539.

Moon T., et al., "Online Learning for Recency Search Ranking Using Real-Time User Feedback," Proceedings of the 19th ACM International Conference on Information and Knowledge Management (CIKM '10), Oct. 2010, pp. 1501-1504.

Mun H., et al., "Accelerating Smart Speaker Service with Content Prefetching and Local Control," In IEEE 17th Annual Consumer Communications & Networking Conference (CCNC), Jan. 10-13, 2020, 6 pages.

Nanas N., et al., "Multi-topic Information Filtering with a Single User Profile," Springer-Verlag Berlin Germany, SETN, LNAI 3025, 2004, pp. 400-409.

Non-Final Office Action mailed Apr. 13, 2026 for U.S. Appl. No. 19/232,701, filed Jun. 9, 2025, 17 pages.

Non-Final Office Action mailed Aug. 21, 2025 for U.S. Appl. No. 18/892,786, filed Sep. 23, 2024, 20 pages.

Non-Final Office Action mailed Aug. 29, 2025 for U.S. Appl. No. 18/500,825, filed Nov. 2, 2023, 46 pages.

Notice of Allowance mailed Sep. 3, 2025 for U.S. Appl. No. 18/915,864, filed Oct. 15, 2024, 2 pages.

Notice of Allowance mailed Mar. 11, 2026 for U.S. Appl. No. 18/500,825, filed Nov. 2, 2023, 14 pages.

Notice of Allowance mailed Jul. 22, 2025 for U.S. Appl. No. 18/915,864, filed Oct. 15, 2024, 13 pages.

Notice of Allowance mailed Oct. 22, 2025 for U.S. Appl. No. 18/915,864, filed Oct. 15, 2024, 2 pages.

Notice of Allowance mailed Mar. 24, 2026 for U.S. Appl. No. 18/500,825, filed Nov. 2, 2023, 5 pages.

Office Action mailed Mar. 4, 2024 for Chinese Application No. 201880094832.0, filed Oct. 4, 2018, 36 pages.

Office Action mailed Jan. 15, 2024 for Chinese Application No. 201880094857.0, filed Jun. 20, 2018, 33 pages.

Office Action mailed Jan. 15, 2025 for European Patent Application No. 19722425.6, filed on Apr. 19, 2019, 10 pages.

Office Action mailed May 15, 2024 for Chinese Application No. 201880094771.8, filed Jun. 25, 2018, 8 pages.

(56) References Cited

OTHER PUBLICATIONS

Office Action mailed Jan. 17, 2024 for Chinese Application No. 201880094827.X, filed Jul. 19, 2018, 10 pages.
Office Action mailed Dec. 21, 2023 for Chinese Application No. 201880094771.8, filed Jun. 25, 2018, 44 pages.
Office Action mailed Sep. 22, 2025 for European Patent Application No. 18915309.1, filed on Oct. 4, 2018, 8 pages.
Office Action mailed Jul. 25, 2024 for Chinese Application No. 201980040312.6, filed Apr. 19, 2019, 18 pages.
Office Action mailed Dec. 26, 2023 for Chinese Application No. 201880094305.X, filed May 25, 2018, 7 pages.
Wong Y.W., et al., "Scalable Attribute-Value Extraction from Semi-Structured Text," IEEE International Conference on Data Mining Workshops, Dec. 2009, pp. 302-307.
Office Action mailed Dec. 29, 2023 for Chinese Application No. 201880094828.4, filed Aug. 3, 2018, 53 pages.
Ostendorf M., et al., "Human Language Technology: Opportunities and Challenges," IEEE International Conference on Acoustics Speech and Signal Processing, Mar. 23, 2005, 5 Pages.
"Overview of Language Technology," Feb. 15, 2018, 1 Page, Retrieved from Internet: URL: https://www.dfki.de/lt/lt-generaL.php.
Patel A., et al., "Cross-Lingual Phoneme Mapping for Language Robust Contextual Speech Recognition," IEEE International Conference on Acoustics, Speech and Signal Processing (ICASSP), Apr. 2018, pp. 5924-5928.
Poliak A., et al., "Efficient, Compositional, Order-Sensitive n-gram Embeddings," Proceedings of the 15th Conference of the European Chapter of the Association for Computational Linguistics, Apr. 3-7, 2017, vol. 2, pp. 503-508.
Ren H., et al., "Dialog State Tracking using Conditional Random Fields," Proceedings of the SIGDIAL Conference, Association for Computational Linguistics, Aug. 22-24, 2013, pp. 457-461.
Sarikaya R., "The Technology Behind Personal Digital Assistants: An Overview of the System Architecture and Key Components," IEEE Signal Processing Magazine, Jan. 1, 2017, vol. 34 (1), pp. 67-81, XP011639190.
So C.F., et al., "Ontological User Profiling and Language Modeling for Personalized Information Services," 2009 IEEE International Conference on e-Business Engineering, Macau, China, 2009, pp. 559-564.
Sood A., et al., "Topic-Focused Summarization of Chat Conversations," ECIR, LNCS 7814, Springer-Verlag, Berlin, Germany, 2013, pp. 800-803.
Takahashi Y., et al., "User and Device Adaptation for Sports Video Content," 2007 IEEE International Conference on Multimedia and Expo, Jul. 5, 2007, pp. 1051-1054.
Tepper N., et al., "Collabot: Personalized Group Chat Summarization," In Proceedings of the Eleventh ACM International Conference on Web Search and Data Mining, Feb. 5, 2018, pp. 771-774.
Trottier D., "A Research Agenda for Social Media Surveillance," Fast Capitalism, Jan. 2011, vol. 8, Issue 1, pp. 59-68.
Turniski F., et al., "Analysis of 3G and 4G Download Throughput in Pedestrian Zones," Proceedings Elmar—2013, Sep. 12, 2016, pp. 9-12, XP032993723.
U.S. Appl. No. 62/655,751, inventors Harrison; Jason Francis et al., filed on Apr. 10, 2018.
U.S. Appl. No. 62/660,876, inventors Kumar; Anuj et al., filed on Apr. 20, 2018.
U.S. Appl. No. 62/675,090, inventors Hanson; Michael Robert et al., filed on May 22, 2018.
U.S. Appl. No. 62/747,628, inventors Liu; Honglei et al., filed on Oct. 18, 2018.
U.S. Appl. No. 62/749,608, inventors Challa; Ashwini et al., filed on Oct. 23, 2018.
U.S. Appl. No. 62/750,746, inventors Liu; Honglei et al., filed on Oct. 25, 2018.
U.S. Appl. No. 62/923,342, inventors Hanson; Michael Robert et al., filed on Oct. 18, 2019.
USTPO—Office Action dated Nov. 12, 2024 for related U.S. Appl. No. 17/870,110, filed Jul. 21, 2022, 35 Pages.
Vanchinathan H.P., et al., "Explore-Exploit in Top-N Recommender Systems via Gaussian Processes," Proceedings of the 8th ACM Conference on Recommender systems (RecSys '14), Oct. 2014, pp. 225-232.
Wang W., et al., "Rafiki: Machine Learning as an Analytics Service System," arXiv: 1804.06087v1, Apr. 17, 2018, pp. 1-13.
Wang X., et al., "Exploration in Interactive Personalized Music Recommendation: A Reinforcement Learning Approach," ACM Transactions on Multimedia Computing, Communications, and Applications, arXiv: 1311.6355v1, Oct. 2013, vol. 2 (3), pp. 1-24.
Wen; et al., "Personalized Language Modeling by Crowd Sourcing with Social Network Data for Voice Access of Cloud Applications," 2012 IEEE Spoken Language Technology Workshop (SLT), Dec. 2, 2012, pp. 188-193.
"What is Conversational AI?," Glia Blog [Online], Sep. 13, 2017 [Retrieved on Jun. 14, 2019], 3 Pages, Retrieved from Internet: URL: https://blog.salemove.com/what-is-conversational-ai/.
Wikipedia, "Dialog Manager," Dec. 16, 2006-Mar. 13, 2018 [Retrieved on Jun. 14, 2019], 8 Pages, Retrieved from Internet: https://en.wikipedia.org/wiki/Dialog_manager.
Wikipedia, "Natural-Language Understanding," Nov. 11, 2018-Apr. 3, 2019 [Retrieved on Jun. 14, 2019], 5 Pages, Retrieved from Internet: URL: https://en.wikipedia.org/wiki/Natural-language_understanding.
Wikipedia, "Speech Synthesis," Jan. 24, 2004-Jun. 5, 2019 [Retrieved on Jun. 14, 2019], 19 Pages, Retrieved from Internet: URL: https://en.wikipedia.org/wiki/Speech_synthesis.
Wikipedia, "Question Answering," Feb. 15, 2018 [Retrieved on Jun. 14, 2019], 6 Pages, Retrieved from Internet: URL: https://en.wikipedia.org/wiki/Question_answering.
Anonymous, "Semantic Parsing," Wikipedia, Mar. 22, 2018, 5 pages, Retrieved from the Internet: URL: https://en.wikipedia.org/w/index.php?title=Semantic_parsing&oldid=831890029, [Retrieved on May 24, 2022].
Anonymous, "Semantic Role Labeling," Wikipedia, Jan. 27, 2018, 2 pages, Retrieved from the Internet: URL: https://en.wikipedia.org/w/index.php?title=Semantic_role_labeling&oldid=822626564, [Retrieved on May 24, 2022].
Armentano M.G., et al., "A Framework for Attaching Personal Assistants to Existing Applications," Computer Languages, Systems & Structures, Dec. 2009, vol. 35(4), pp. 448-463.
Bailey K., "Conversational AI and the Road Ahead," TechCrunch [Online], Feb. 15, 2018 [Retrieved on Jun. 14, 2019], 13 Pages, Retrieved from Internet: URL: https://techcrunch.com/2017/02/25/conversational-ai-and-the-road-ahead/.
Bang J., et al., "Example-Based Chat-Oriented Dialogue System With Personalized Long-Term Memory," International Conference on Big Data and Smart Computing (BIGCOMP), Jeju, South Korea, 2015, pp. 238-243.
Batrinca B., et al., "Social media analytics: a survey of techniques, tools and platforms,", AI & Society [Online], Feb. 2015, vol. 30 (1), pp. 89-116, [Retrieved on Mar. 28, 2019], Retrieved from the Internet: URL: https://link.springer.com/article/10.1007/s00146-014-0549-4.
Candito M.H., et al., "Can the TAG Derivation Tree Represent a Semantic Graph? An Answer in the Light of Meaning-Text Theory," Proceedings of the Fourth International Workshop on Tree Adjoining Grammars and Related Frameworks (TAG+ 4), Aug. 1998, 04 pages.
Challa A., et al., "Generate, Filter, and Rank: Grammaticality Classification for Production-Ready NLG Systems," Facebook Conversational AI, Apr. 9, 2019, 10 Pages.
"Chat Extensions," [online], Apr. 18, 2017, 8 Pages, Retrieved from the Internet: URL: https://developers.facebook.com/docs/messenger-platform/guides/chat-extensions/.
Chen Y.N., et al., "Knowledge as a Teacher: Knowledge-Guided Structural Attention Networks," arXiv preprint arXiv: 1609.03286, Sep. 2016, 12 pages.
Chen Y.N., et al., "Matrix Factorization with Domain Knowledge and Behavioral Patterns for Intent Modeling," NIPS Workshop on Machine Learning for SLU and Interaction, 2015, pp. 1-7.

(56) References Cited

OTHER PUBLICATIONS

Co-pending U.S. Appl. No. 15/967,193, inventors Testuggine; Davide et al., filed on Apr. 30, 2018.
Co-pending U.S. Appl. No. 16/025,317, inventors Gupta; Sonal et al., filed on Jul. 2, 2018.
Co-pending U.S. Appl. No. 16/048,072, inventor Salkola; Markku , filed on Jul. 27, 2018.
Co-pending U.S. Appl. No. 16/048,101, inventor Salkola; Markku , filed on Jul. 27, 2018.
Co-pending U.S. Appl. No. 16/121,393, inventors Zhou; Zheng et al., filed on Sep. 4, 2018.
Co-pending U.S. Appl. No. 16/168,536, inventors Dumoulin; Benoit F et al., filed on Oct. 23, 2018.
Co-pending U.S. Appl. No. 16/376,832, inventors Liu; Honglei et al., filed on Apr. 5, 2019.
Co-pending U.S. Appl. No. 16/389,738, inventors Peng; Fuchun et al., filed on Apr. 19, 2019.
Co-pending U.S. Appl. No. 16/434,010, inventors Dogaru; Sergiu et al., filed on Jun. 6, 2019.
Co-pending U.S. Appl. No. 16/659,203, inventors Huang; Lisa Xiaoyi et al., filed on Oct. 21, 2019.
Co-pending U.S. Appl. No. 17/186,459, inventors Liu; Bing et al., filed on Feb. 26, 2021.
Csaky R.K., "Deep Learning Based Chatbot Models," Budapest University of Technology and Economics, Nov. 2017, 69 pages, Retrieved from the Internet: URL: https://www.researchgate.net/publication/323587007_Deep_Learning_Based_Chatbot_Models.
Dubin R., et al., "Adaptation Logic for HTTP Dynamic Adaptive Streaming using Geo-Predictive Crowdsourcing," Springer, Feb. 5, 2016, 11 Pages.
Dyer C., et al., "Recurrent Neural Network Grammars," Proceedings of NAACL-HLT, San Diego, California, Jun. 12-17, 2016, pp. 199-209.
European Search Report for European Patent Application No. 25165346.5, dated Jul. 7, 2025, 8 pages.
Final Office Action mailed Dec. 23, 2025 for U.S. Appl. No. 18/892,786, filed Sep. 23, 2024, 21 pages.
Germanakos P., et al., "Realizing Comprehensive User Profile as the Core Element of Adaptive and Personalized Communication Environments and Systems," The Computer Journal, Oct. 31, 2009, vol. 52, No. 7, pp. 749-770.
Glass J., "A Brief Introduction to Automatic Speech Recognition," Nov. 13, 2007, 22 Pages, Retrieved from Internet: http://www.cs.columbia.edu/~mcollins/6864/slides/asr.pdf.
Golovin D., et al., "Google Vizier: A Service for Black-Box Optimization," Proceedings of the 23rd ACM International Conference on Knowledge Discovery and Data Mining, Aug. 13-17, 2017, vol. 23, pp. 1487-1495.
Google Allo Makes Conversations Eeasier, Productive, and more Expressive, May 19, 2016 [Retrieved on Jul. 11, 2019], 13 Pages, Retrieved from Internet: URL: https://www.trickyways.com/2016/05/google-allo-makes-conversations-eeasier-productive-expressive/.
Grow your Business with Social Bots, Digital Marketing Institute, Nov. 20, 2017, 14 pages, Retrieved from the Internet: URL: https://digitalmarketinginstitute.com/blog/grow-your-business-with-social-bots.
Guo D.Z., et al., "Joint Semantic Utterance Classification and Slot Filling With Recursive Neural Networks," IEEE Spoken Language Technology Workshop (SLT), 2014, pp. 554-559.
Hazen J.T., et al., "Pronunciation Modeling using a Finite-State Transducer Representation," Speech Communication, vol. 46, Jun. 2005, pp. 189-203.
Honglei L., et al., "Explore-Exploit: A Framework for Interactive and Online Learning," Dec. 1, 2018, 7 pages.
Huang S., "Word2Vec and FastText Word Embedding with Gensim," Towards Data Science [Online], Feb. 4, 2018 [Retrieved on Jun. 14, 2019], 11 Pages, Retrieved from Internet: URL: https://towardsdatascience.com/word-embedding-with-word2vec-and-fasttext-a209c1d3e12c.
Huang Z., et al., "Bidirectional LSTM-CRF Models for Sequence Tagging," arXiv preprint, arXiv:1508.01991, 2015, 10 pages.
International Search Report and Written Opinion for International Application No. PCT/US2018/033116, mailed Jan. 17, 2019, 10 Pages.
International Search Report and Written Opinion for International Application No. PCT/US2018/034604, mailed Jan. 18, 2019, 13 Pages.
International Search Report and Written Opinion for International Application No. PCT/US2018/038396, mailed Jan. 21, 2019, 13 Pages.
International Search Report and Written Opinion for International Application No. PCT/US2018/039268, mailed Jan. 18, 2019, 14 Pages.
International Search Report and Written Opinion for International Application No. PCT/US2018/042906, mailed Feb. 27, 2019, 10 Pages.
International Search Report and Written Opinion for International Application No. PCT/US2018/045177, mailed Jan. 16, 2019, 15 Pages.
International Search Report and Written Opinion for International Application No. PCT/US2018/049568, mailed Feb. 11, 2019, 25 Pages.
International Search Report and Written Opinion for International Application No. PCT/US2018/054322, mailed Feb. 8, 2019, 15 Pages.
International Search Report and Written Opinion for International Application No. PCT/US2019/028187, mailed Aug. 12, 2019, 11 Pages.
International Search Report and Written Opinion for International Application No. PCT/US2019/028387, mailed Aug. 21, 2019, 12 Pages.
Kar R., et al, "Applying Chatbots to the Internet of Things: Opportunities and Architectural Elements," arXiv:1611.03799v1, submitted on Nov. 11, 2016, (2017), 9 pages.
Klopfenstein L.C., et al., "The Rise of Bots: A survey of Conversational Interfaces, Patterns, and Paradigms," DIS 2017 Proceedings of the 2017 Conference on Designing Interactive Systems, Jun. 10, 2017, pp. 555-565.
Komer B., et al., "Hyperopt-Sklearn: Automatic Hyperparameter Configuration for Scikit-Learn," Proceedings of the 13th Python in Science Conference, 2014, vol. 13, pp. 34-40.
Non-Final Office Action mailed May 22, 2026 for U.S. Appl. No. 18/892,786, filed Sep. 23, 2024, 20 pages.

* cited by examiner

200

600

800

TECHNIQUES FOR RECOGNIZING ALTERNATIVE INPUT VIA GESTURE RECOGNITION TUPLES FOR USER INTERACTIONS WITH ASSISTANT SYSTEMS

CROSS-REFERENCE TO RELATED APPLICATIONS

This application is a continuation of U.S. patent application Ser. No. 18/915,864, filed Oct. 15, 2024, which is a continuation of U.S. patent application Ser. No. 18/449,525, filed Aug. 14, 2023, now issued as U.S. Pat. No. 12,125,272, which is a continuation of U.S. patent application Ser. No. 17/566,308, filed on Dec. 30, 2021, now issued as U.S. Pat. No. 11,727,677, which is a continuation of U.S. patent application Ser. No. 17/010,619, filed on Sep. 2, 2020, now issued as U.S. Pat. No. 11,231,946, which is a continuation of U.S. patent application Ser. No. 16/388,130, filed on Apr. 18, 2019, now issued as U.S. Pat. No. 10,802,848, which claims the benefit of and priority to U.S. Provisional Patent Application No. 62/660,876, filed on Apr. 20, 2018. Each of the aforementioned applications is hereby incorporated by reference in its entirety.

TECHNICAL FIELD

This disclosure generally relates to dialog management based on machine-learning techniques within network environments, and in particular relates to hardware and software for smart assistant systems.

BACKGROUND

An assistant system can provide information or services on behalf of a user based on a combination of user input, location awareness, and the ability to access information from a variety of online sources (such as weather conditions, traffic congestion, news, stock prices, user schedules, retail prices, etc.). The user input may include text (e.g., online chat), especially in an instant messaging application or other applications, voice, images, motion, or a combination of them. The assistant system may perform concierge-type services (e.g., making dinner reservations, purchasing event tickets, making travel arrangements) or provide information based on the user input. The assistant system may also perform management or data-handling tasks based on online information and events without user initiation or interaction. Examples of those tasks that may be performed by an assistant system may include schedule management (e.g., sending an alert to a dinner date that a user is running late due to traffic conditions, update schedules for both parties, and change the restaurant reservation time). The assistant system may be enabled by the combination of computing devices, application programming interfaces (APIs), and the proliferation of applications on user devices.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. profile/news feed posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, the assistant system may assist a user to obtain information or services. The assistant system may enable the user to interact with it with multi-modal user input (such as voice, text, image, video, motion) in stateful and multi-turn conversations to get assistance. The assistant system may create and store a user profile comprising both personal and contextual information associated with the user. In particular embodiments, the assistant system may analyze the user input using natural-language understanding. The analysis may be based on the user profile for more personalized and context-aware understanding. The assistant system may resolve entities associated with the user input based on the analysis. In particular embodiments, the assistant system may interact with different agents to obtain information or services that are associated with the resolved entities. The assistant system may generate a response for the user regarding the information or services by using natural-language generation. Through the interaction with the user, the assistant system may use dialog management techniques to manage and forward the conversation flow with the user. In particular embodiments, the assistant system may further assist the user to effectively and efficiently digest the obtained information by summarizing the information. The assistant system may also assist the user to be more engaging with an online social network by providing tools that help the user interact with the online social network (e.g., creating posts, comments, messages). The assistant system may additionally assist the user to manage different tasks such as keeping track of events. In particular embodiments, the assistant system may proactively execute tasks that are relevant to user interests and preferences based on the user profile without a user input. In particular embodiments, the assistant system may check privacy settings to ensure that accessing a user's profile or other user information and executing different tasks are permitted subject to the user's privacy settings.

In particular embodiments, the assistant system may train a personalized gesture-classification model. The training may include receiving a plurality of input tuples each comprising a gesture-input and a speech-input, determining a plurality of intents based on the speech-inputs by a natural-language understanding (NLU) module, accessing a general gesture-classification model, associating the intents with their respective gesture-inputs, and training a personalized gesture-classification model based on the associations between the intents and the gesture-inputs, and also the general gesture-classification model. In particular embodiments, the general gesture-classification model may be generated by crowdsourcing with respect to a large number of standard gestures. However, the general gesture-classification model may be unable to determine the correct intent of a particular user's gesture, especially if the user is using a non-standard gesture or a gesture that is typically used for a different intent. Therefore, the training of the personalized gesture-classification model may additionally leverage the informative cues from the user's own input comprising both speech and gestures on top of the general gesture-classification model. Besides using the speech-input separately to assist in the training of the personalized gesture-classification model, the assistant system may alternatively train the personalized gesture-classification model by utilizing the speech-inputs and gesture-inputs jointly. Once the personalized gesture-classification model is trained, the assistant system may use it to determine a user's intents corresponding to his/her own gestures in the future. Although this disclosure describes training particular gesture-classification models via particular systems in particular manners, this disclosure contemplates training any suitable gesture-classification model via any suitable system in any suitable manner.

In particular embodiments, the assistant system may access, from a data store, a plurality of input tuples associated with a first user. Each input tuple may comprise a gesture-input and a corresponding speech-input. In particular embodiments, the assistant system may then determine, by a natural-language understanding (NLU) module, a plurality of intents corresponding to the plurality of speech-inputs, respectively. The assistant system may then generate, for the plurality of gesture-inputs, a plurality of feature representations based on one or more machine-learning models. In particular embodiments, the assistant system may then determine a plurality of gesture identifiers for the plurality of gesture-inputs, respectively, based on their respective feature representations. The assistant system may then associate the plurality of intents with the plurality of gesture identifiers, respectively. In particular embodiments, the assistant system may further train, for the first user, a personalized gesture-classification model based on the plurality of feature representations of their respective gesture-inputs and the associations between the plurality of intents and their respective gesture identifiers.

Certain technical challenges may exist for achieving the goal of training a personalized gesture-classification model. One technical challenge may include enabling the personalized gesture-classification model to identify a user's intent from a user's personal gesture. A solution presented by the embodiments disclosed herein to address the above challenge is training the personalized gesture-classification model based on both the user's speech-inputs and gesture-inputs, as the user's intents may be learned from the speech-inputs and association between such intents and gesture-inputs may be generated for further utilization during the training of the personalized gesture-classification model. Another technical challenge may include generating reliable feature representations for gesture-inputs. A solution presented by the embodiments disclosed herein to address this challenge is modeling components of a gesture-input and temporal information associated with the gesture-input into the feature representation since dividing a gesture-input into components may help distinguish a gesture from another and temporal information may carry contextual information indicating a user's intent which is useful for gesture classification.

Certain embodiments disclosed herein may provide one or more technical advantages. A technical advantage of the embodiments may include enriching user experience with the assistant system by enabling the user to interact with the assistant system with gestures besides traditional input such as text and voice, for which the assistant system may accurately recognize a user's gesture and execute tasks corresponding to the recognized gesture. Certain embodiments disclosed herein may provide none, some, or all of the above technical advantages. One or more other technical advantages may be readily apparent to one skilled in the art in view of the figures, descriptions, and claims of the present disclosure.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
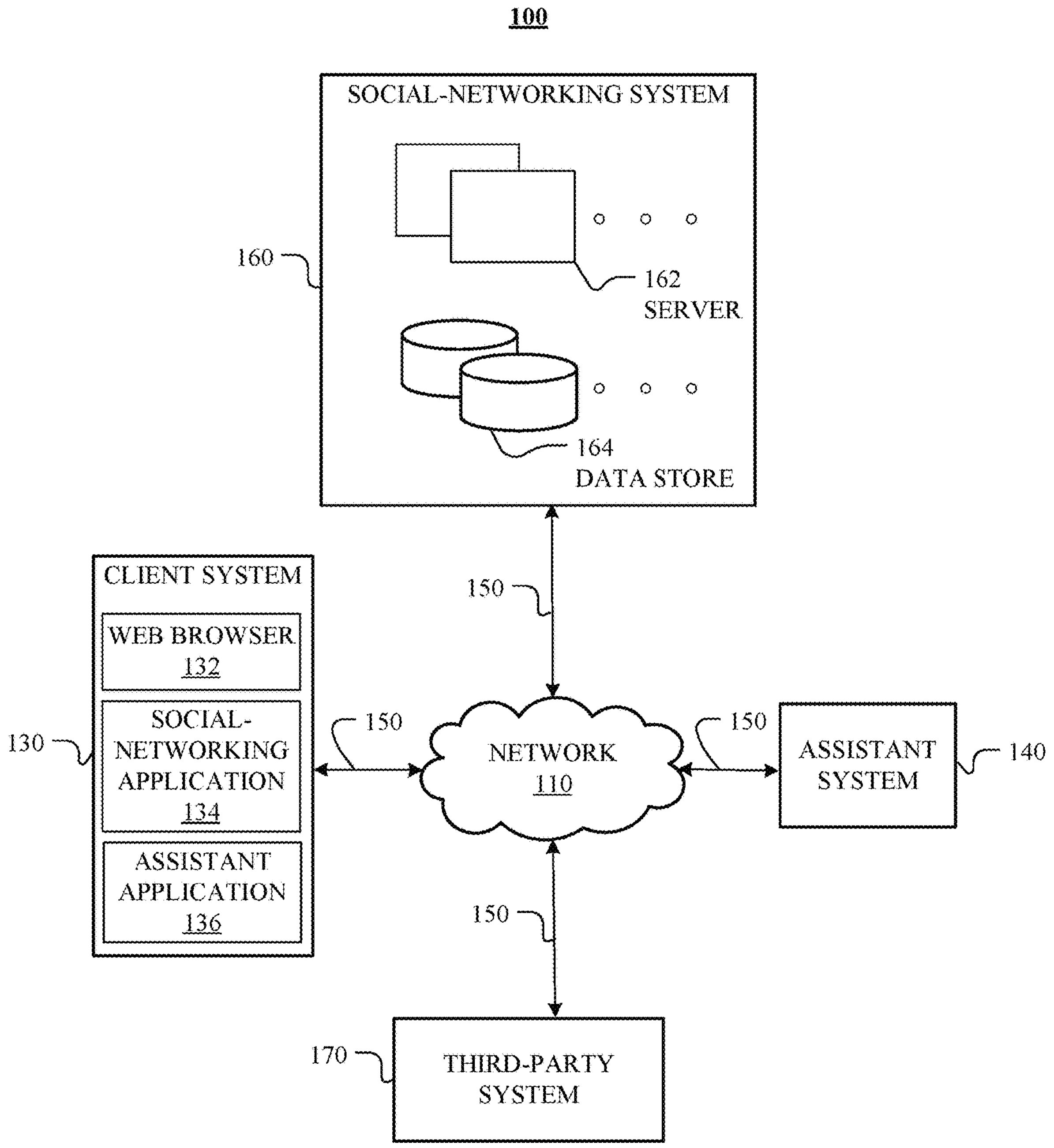
FIG. 1 illustrates an example network environment associated with an assistant system.

FIG. 1 illustrates an example network environment 100 associated with an assistant system. Network environment 100 includes a client system 130, an assistant system 140, a social-networking system 160, and a third-party system 170 connected to each other by a network 110. Although FIG. 1 illustrates a particular arrangement of a client system 130, an assistant system 140, a social-networking system 160, a third-party system 170, and a network 110, this disclosure contemplates any suitable arrangement of a client system

130, an assistant system 140, a social-networking system 160, a third-party system 170, and a network 110. As an example and not by way of limitation, two or more of a client system 130, a social-networking system 160, an assistant system 140, and a third-party system 170 may be connected to each other directly, bypassing a network 110. As another example, two or more of a client system 130, an assistant system 140, a social-networking system 160, and a third-party system 170 may be physically or logically co-located with each other in whole or in part. Moreover, although FIG. 1 illustrates a particular number of client systems 130, assistant systems 140, social-networking systems 160, third-party systems 170, and networks 110, this disclosure contemplates any suitable number of client systems 130, assistant systems 140, social-networking systems 160, third-party systems 170, and networks 110. As an example and not by way of limitation, network environment 100 may include multiple client systems 130, assistant systems 140, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, an assistant system 140, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, smart speaker, virtual reality (VR) headset, augment reality (AR) smart glasses, other suitable electronic device, or any suitable combination thereof. In particular embodiments, the client system 130 may be a smart assistant device. More information on smart assistant devices may be found in U.S. patent application Ser. No. 15/949,011, filed 9 Apr. 2018, U.S. Patent Application No. 62/655,751, filed 10 Apr. 2018, U.S. Design patent application Ser. No. 29/631,910, filed 3 Jan. 2018, U.S. Design patent application Ser. No. 29/631,747, filed 2 Jan. 2018, U.S. Design patent application Ser. No. 29/631,913, filed 3 Jan. 2018, and U.S. Design patent application Ser. No. 29/631,914, filed 3 Jan. 2018, each of which is incorporated by reference. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, and may have one or more add-ons, plug-ins, or other extensions. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts, combinations of markup language and scripts, and the like. Herein, reference to a web interface encompasses one or more corresponding source files (which a browser may use to render the web interface) and vice versa, where appropriate.

In particular embodiments, a client system 130 may include a social-networking application 134 installed on the client system 130. A user at a client system 130 may use the social-networking application 134 to access on online social network. The user at the client system 130 may use the social-networking application 134 to communicate with the user's social connections (e.g., friends, followers, followed accounts, contacts, etc.). The user at the client system 130 may also use the social-networking application 134 to interact with a plurality of content objects (e.g., posts, news articles, ephemeral content, etc.) on the online social network. As an example and not by way of limitation, the user may browse trending topics and breaking news using the social-networking application 134.

In particular embodiments, a client system 130 may include an assistant application 136. A user at a client system 130 may use the assistant application 136 to interact with the assistant system 140. In particular embodiments, the assistant application 136 may comprise a stand-alone application. In particular embodiments, the assistant application 136 may be integrated into the social-networking application 134 or another suitable application (e.g., a messaging application). In particular embodiments, the assistant application 136 may be also integrated into the client system 130, an assistant hardware device, or any other suitable hardware devices. In particular embodiments, the assistant application 136 may be accessed via the web browser 132. In particular embodiments, the user may provide input via different modalities. As an example and not by way of limitation, the modalities may include audio, text, image, video, motion, orientation, etc. The assistant application 136 may communicate the user input to the assistant system 140. Based on the user input, the assistant system 140 may generate responses. The assistant system 140 may send the generated responses to the assistant application 136. The assistant application 136 may then present the responses to the user at the client system 130. The presented responses may be based on different modalities such as audio, text, image, and video. As an example and not by way of limitation, the user may verbally ask the assistant application 136 about the traffic information (i.e., via an audio modality). The assistant application 136 may then communicate the request to the assistant system 140. The assistant system 140 may accordingly generate the result and send it back to the assistant application 136. The assistant application 136 may further present the result to the user in text.

In particular embodiments, an assistant system 140 may assist users to retrieve information from different sources. The assistant system 140 may also assist user to request services from different service providers. In particular embodiments, the assist system 140 may receive a user request for information or services via the assistant application 136 in the client system 130. The assist system 140 may use natural-language understanding to analyze the user request based on user's profile and other relevant information. The result of the analysis may comprise different entities associated with an online social network. The assistant system 140 may then retrieve information or request services associated with these entities. In particular embodiments, the assistant system 140 may interact with the social-networking system 160 and/or third-party system 170 when retrieving information or requesting services for the user. In particular embodiments, the assistant system 140 may generate a personalized communication content for the user using natural-language generating techniques. The personalized communication content may comprise, for example, the retrieved information or the status of the requested services. In particular embodiments, the assistant system 140 may enable the user to interact with it regarding the information or services in a stateful and multi-turn conversation by using dialog-management techniques. The functionality of the assistant system 140 is described in more detail in the discussion of FIG. 2 below.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, an assistant system 140, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes-which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow an assistant system 140 and a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Assistant Systems

Figure 2:
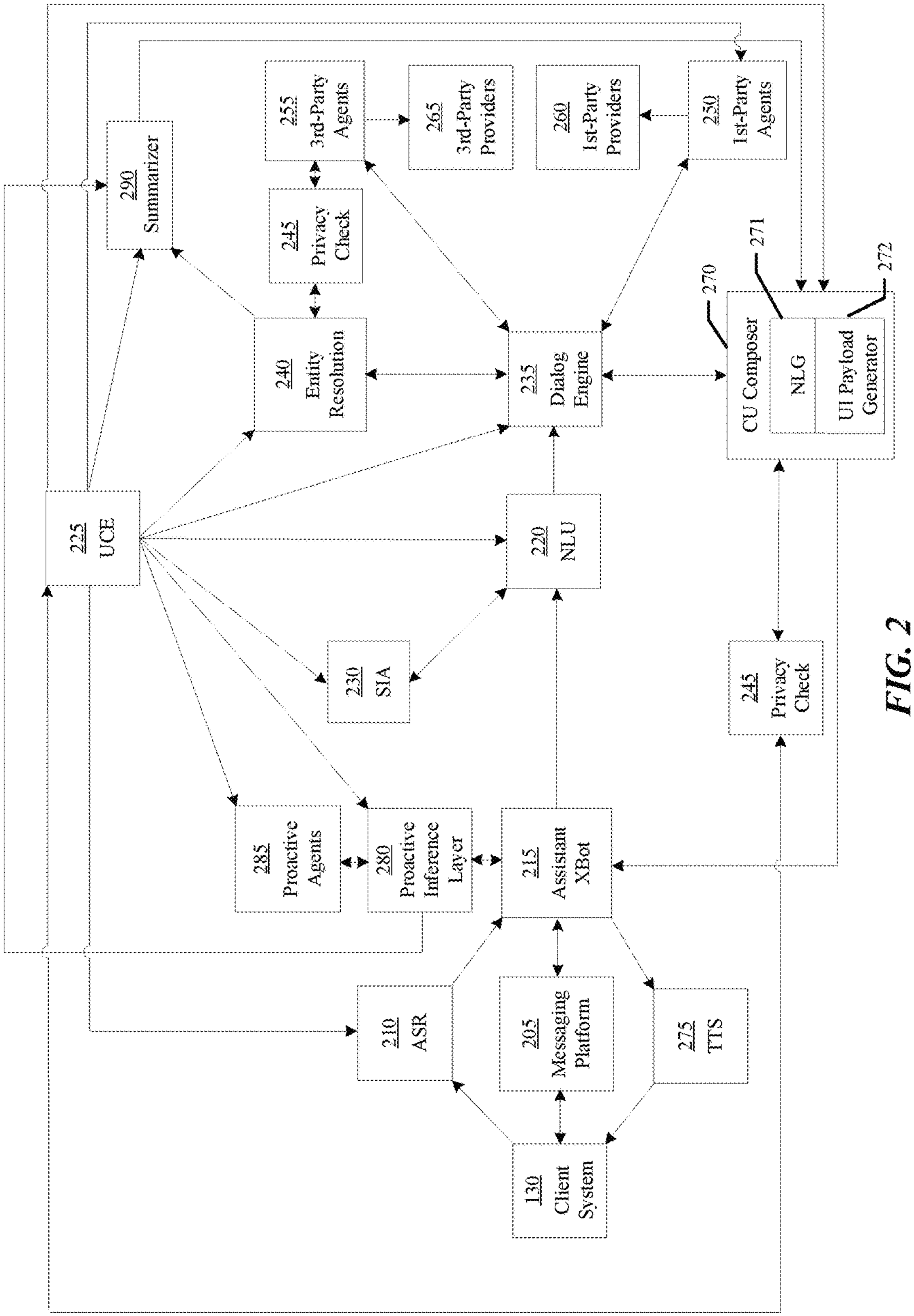
FIG. 2 illustrates an example architecture of the assistant system.

FIG. 2 illustrates an example architecture of the assistant system 140. In particular embodiments, the assistant system 140 may assist a user to obtain information or services. The assistant system 140 may enable the user to interact with it with multi-modal user input (such as voice, text, image, video, motion) in stateful and multi-turn conversations to get assistance. The assistant system 140 may create and store a user profile comprising both personal and contextual information associated with the user. In particular embodiments, the assistant system 140 may analyze the user input using natural-language understanding. The analysis may be based on the user profile for more personalized and context-aware understanding. The assistant system 140 may resolve entities associated with the user input based on the analysis. In particular embodiments, the assistant system 140 may interact with different agents to obtain information or services that are associated with the resolved entities. The assistant system 140 may generate a response for the user regarding the information or services by using natural-language generation. Through the interaction with the user, the assistant system 140 may use dialog management techniques to manage and forward the conversation flow with the user. In particular embodiments, the assistant system 140 may further assist the user to effectively and efficiently digest the obtained information by summarizing the information. The assistant system 140 may also assist the user to be more engaging with an online social network by providing tools that help the user interact with the online social network (e.g., creating posts, comments, messages). The assistant system 140 may additionally assist the user to manage different tasks such as keeping track of events. In particular embodiments, the assistant system 140 may proactively execute pre-authorized tasks that are relevant to user interests and preferences based on the user profile, at a time relevant for the user, without a user input. In particular embodiments, the assistant system 140 may check privacy settings to ensure that accessing a user's profile or other user information and executing different tasks are permitted subject to the user's privacy settings. More information on assisting users subject to privacy settings may be found in U.S. Patent Application No. 62/675,090, filed 22 May 2018, which is incorporated by reference.

In particular embodiments, the assistant system 140 may receive a user input from the assistant application 136 in the client system 130 associated with the user. In particular embodiments, the user input may be a user generated input that is sent to the assistant system 140 in a single turn. If the user input is based on a text modality, the assistant system 140 may receive it at a messaging platform 205. If the user input is based on an audio modality (e.g., the user may speak to the assistant application 136 or send a video including speech to the assistant application 136), the assistant system 140 may process it using an automatic speech recognition (ASR) module 210 to convert the user input into text. If the user input is based on an image or video modality, the assistant system 140 may process it using optical character recognition techniques within the messaging platform 205 to convert the user input into text. The output of the messaging platform 205 or the ASR module 210 may be received at an assistant xbot 215. More information on handling user input based on different modalities may be found in U.S. patent application Ser. No. 16/053,600, filed 2 Aug. 2018, which is incorporated by reference.

In particular embodiments, the assistant xbot 215 may be a type of chat bot. The assistant xbot 215 may comprise a programmable service channel, which may be a software code, logic, or routine that functions as a personal assistant to the user. The assistant xbot 215 may work as the user's portal to the assistant system 140. The assistant xbot 215 may therefore be considered as a type of conversational agent. In particular embodiments, the assistant xbot 215 may send the textual user input to a natural-language understanding (NLU) module 220 to interpret the user input. In particular embodiments, the NLU module 220 may get information from a user context engine 225 and a semantic information aggregator (SIA) 230 to accurately understand the user input. The user context engine 225 may store the user profile of the user. The user profile of the user may comprise user-profile data including demographic information, social information, and contextual information associated with the user. The user-profile data may also include user interests and preferences on a plurality of topics, aggregated through conversations on news feed, search logs, messaging platform 205, etc. The usage of a user profile may be protected behind a privacy check module 245 to ensure that a user's information can be used only for his/her benefit, and not shared with anyone else. More information on user profiles may be found in U.S. patent application Ser. No. 15/967,239, filed 30 Apr. 2018, which is incorporated by reference. The semantic information aggregator 230 may provide ontology data associated with a plurality of predefined domains, intents, and slots to the NLU module 220. In particular embodiments, a domain may denote a social context of interaction, e.g., education. An intent may be an element in a pre-defined taxonomy of semantic intentions, which may indicate a purpose of a user interacting with the assistant system 140. In particular embodiments, an intent may be an output of the NLU module 220 if the user input comprises a text/speech input. The NLU module 220 may classify the text/speech input into a member of the predefined taxonomy, e.g., for the input "Play Beethoven's 5th," the NLU module 220 may classify the input as having the intent [IN: play_music]. In particular embodiments, a domain may be conceptually a namespace for a set of intents, e.g., music. A slot may be a named sub-string with the user input, representing a basic semantic entity. For example, a slot for "pizza" may be [SL: dish]. In particular embodiments, a set of valid or expected named slots may be conditioned on the classified intent. As an example and not by way of limitation, for [IN: play_music], a slot may be [SL: song_name]. The semantic information aggregator 230 may additionally extract information from a social graph, a knowledge graph, and a concept graph, and retrieve a user's profile from the user context engine 225. The semantic information aggregator 230 may further process information from these different sources by determining what information to aggregate, annotating n-grams of the user input, ranking the n-grams with confidence scores based on the aggregated information, formulating the ranked n-grams into features that can be used by the NLU module 220 for understanding the user input. More information on aggregating semantic information may be found in U.S. patent application Ser. No. 15/967,342, filed 30 Apr. 2018, which is incorporated by reference. Based on the output of the user context engine 225 and the semantic information aggregator 230, the NLU module 220 may identify a domain, an intent, and one or more slots from the user input in a personalized and context-aware manner. As an example and not by way of limitation, a user input may comprise "show me how to get to the coffee shop". The NLU module 220 may identify the particular coffee shop that the user wants to go based on the user's personal information and the associated contextual information. In particular embodiments, the NLU module 220 may comprise a lexicon of language and a parser and grammar rules to partition sentences into an internal representation. The NLU module 220 may also comprise one or more programs that perform naive semantics or stochastic semantic analysis to the use of pragmatics to understand a user input. In particular embodiments, the parser may be based on a deep learning architecture comprising multiple long-short term memory (LSTM) networks. As an example and not by way of limitation, the parser may be based on a recurrent neural network grammar (RNNG) model, which is a type of recurrent and recursive LSTM algorithm. More information on natural-language understanding may be found in U.S. patent application Ser. No. 16/011,062, filed 18 Jun. 2018, U.S. patent application Ser. No. 16/025,317, filed 2 Jul. 2018, and U.S. patent application Ser. No. 16/038,120, filed 17 Jul. 2018, each of which is incorporated by reference.

In particular embodiments, the identified domain, intent, and one or more slots from the NLU module 220 may be sent to a dialog engine 235. In particular embodiments, the dialog engine 235 may manage the dialog state and flow of the conversation between the user and the assistant xbot 215. The dialog engine 235 may additionally store previous conversations between the user and the assistant xbot 215. In particular embodiments, the dialog engine 235 may communicate with an entity resolution module 240 to resolve entities associated with the one or more slots, which supports the dialog engine 235 to forward the flow of the conversation between the user and the assistant xbot 215. In particular embodiments, the entity resolution module 240 may access the social graph, the knowledge graph, and the concept graph when resolving the entities. Entities may include, for example, unique users or concepts, each of which may have a unique identifier (ID). As an example and not by way of limitation, the knowledge graph may comprise a plurality of entities. Each entity may comprise a single record associated with one or more attribute values. The particular record may be associated with a unique entity identifier. Each record may have diverse values for an attribute of the entity. Each attribute value may be associated with a confidence probability. A confidence probability for an attribute value represents a probability that the value is accurate for the given attribute. Each attribute value may be also associated with a semantic weight. A semantic weight for an attribute value may represent how the value semantically appropriate for the given attribute considering all the available information. For example, the knowledge graph may comprise an entity of a movie "The Martian" (2015), which includes information that has been extracted from multiple content sources (e.g., social media, knowledge bases, movie review sources, media databases, and entertainment content sources), and then deduped, resolved, and fused to generate the single unique record for the knowledge graph. The entity may be associated with a space attribute value which indicates the genre of the movie "The Martian" (2015). More information on the knowledge graph may be found in U.S. patent application Ser. No. 16/048,049, filed 27 Jul. 2018, and U.S. patent application Ser. No. 16/048,101, filed 27 Jul. 2018, each of which is incorporated by reference. The entity resolution module 240 may additionally request a user profile of the user associated with the user input from the user context engine 225. In particular embodiments, the entity resolution module 240 may communicate with a privacy check module 245 to guarantee that the resolving of the entities does not violate privacy policies. In particular embodiments, the privacy check module 245 may use an authorization/privacy server to enforce privacy policies. As an example and not by way of limitation, an entity to be resolved may be another user who specifies in his/her privacy settings that his/her identity should not be searchable on the online social network, and thus the entity resolution module 240 may not return that user's identifier in response to a request. Based on the information obtained from the social graph, knowledge graph, concept graph, and user profile, and subject to applicable privacy policies, the entity resolution module 240 may therefore accurately resolve the entities associated with the user input in a personalized and context-aware manner. In particular embodiments, each of the resolved entities may be associated with one or more identifiers hosted by the social-networking system 160. As an example and not by way of limitation, an identifier may comprise a unique user identifier (ID). In particular embodiments, each of the resolved entities may be also associated with a confidence score. More information on resolving entities may be found in U.S. patent application Ser. No. 16/048,049, filed 27 Jul. 2018, and U.S. patent application Ser. No. 16/048,072, filed 27 Jul. 2018, each of which is incorporated by reference.

In particular embodiments, the dialog engine 235 may communicate with different agents based on the identified intent and domain, and the resolved entities. In particular embodiments, an agent may be an implementation that serves as a broker across a plurality of content providers for one domain. A content provider may be an entity responsible for carrying out an action associated with an intent or completing a task associated with the intent. As an example and not by way of limitation, multiple device-specific implementations (e.g., real-time calls for a client system 130 or a messaging application on the client system 130) may be handled internally by a single agent. Alternatively, these device-specific implementations may be handled by multiple agents associated with multiple domains. In particular embodiments, the agents may comprise first-party agents 250 and third-party agents 255. In particular embodiments, first-party agents 250 may comprise internal agents that are accessible and controllable by the assistant system 140 (e.g. agents associated with services provided by the online social network). In particular embodiments, third-party agents 255 may comprise external agents that the assistant system 140 has no control over (e.g., music streams agents, ticket sales agents). The first-party agents 250 may be associated with first-party providers 260 that provide content objects and/or services hosted by the social-networking system 160. The third-party agents 255 may be associated with third-party providers 265 that provide content objects and/or services hosted by the third-party system 170.

In particular embodiments, the communication from the dialog engine 235 to the first-party agents 250 may comprise requesting particular content objects and/or services provided by the first-party providers 260. As a result, the first-party agents 250 may retrieve the requested content objects from the first-party providers 260 and/or execute tasks that command the first-party providers 260 to perform the requested services. In particular embodiments, the communication from the dialog engine 235 to the third-party agents 255 may comprise requesting particular content objects and/or services provided by the third-party providers 265. As a result, the third-party agents 255 may retrieve the requested content objects from the third-party providers 265 and/or execute tasks that command the third-party providers 265 to perform the requested services. The third-party agents 255 may access the privacy check module 245 to guarantee no privacy violations before interacting with the third-party providers 265. As an example and not by way of limitation, the user associated with the user input may specify in his/her privacy settings that his/her profile information is invisible to any third-party content providers. Therefore, when retrieving content objects associated with the user input from the third-party providers 265, the third-party agents 255 may complete the retrieval without revealing to the third-party providers 265 which user is requesting the content objects.

In particular embodiments, each of the first-party agents 250 or third-party agents 255 may be designated for a particular domain. As an example and not by way of limitation, the domain may comprise weather, transportation, music, etc. In particular embodiments, the assistant system 140 may use a plurality of agents collaboratively to respond to a user input. As an example and not by way of limitation, the user input may comprise "direct me to my next meeting." The assistant system 140 may use a calendar agent to retrieve the location of the next meeting. The assistant system 140 may then use a navigation agent to direct the user to the next meeting.

In particular embodiments, each of the first-party agents 250 or third-party agents 255 may retrieve a user profile from the user context engine 225 to execute tasks in a personalized and context-aware manner. As an example and not by way of limitation, a user input may comprise "book me a ride to the airport." A transportation agent may execute the task of booking the ride. The transportation agent may retrieve the user profile of the user from the user context engine 225 before booking the ride. For example, the user profile may indicate that the user prefers taxis, so the transportation agent may book a taxi for the user. As another example, the contextual information associated with the user profile may indicate that the user is in a hurry so the transportation agent may book a ride from a ride-sharing service for the user since it may be faster to get a car from a ride-sharing service than a taxi company. In particular embodiment, each of the first-party agents 250 or third-party agents 255 may take into account other factors when executing tasks. As an example and not by way of limitation, other factors may comprise price, rating, efficiency, partnerships with the online social network, etc.

In particular embodiments, the dialog engine 235 may communicate with a conversational understanding composer (CU composer) 270. The dialog engine 235 may send the requested content objects and/or the statuses of the requested services to the CU composer 270. In particular embodiments, the dialog engine 235 may send the requested content objects and/or the statuses of the requested services as a <k, c, u, d> tuple, in which k indicates a knowledge source, c indicates a communicative goal, u indicates a user model, and d indicates a discourse model. In particular embodiments, the CU composer 270 may comprise a natural-language generator (NLG) 271 and a user interface (UI) payload generator 272. The natural-language generator 271 may generate a communication content based on the output of the dialog engine 235. In particular embodiments, the NLG 271 may comprise a content determination component, a sentence planner, and a surface realization component. The content determination component may determine the communication content based on the knowledge source, communicative goal, and the user's expectations. As an example and not by way of limitation, the determining may be based on a description logic. The description logic may comprise, for example, three fundamental notions which are individuals (representing objects in the domain), concepts (describing sets of individuals), and roles (representing binary relations between individuals or concepts). The description logic may be characterized by a set of constructors that allow the natural-language generator 271 to build complex concepts/roles from atomic ones. In particular embodiments, the content determination component may perform the following tasks to determine the communication content. The first task may comprise a translation task, in which the input to the natural-language generator 271 may be translated to concepts. The second task may comprise a selection task, in which relevant concepts may be selected among those resulted from the translation task based on the user model. The third task may comprise a verification task, in which the coherence of the selected concepts may be verified. The fourth task may comprise an instantiation task, in which the verified concepts may be instantiated as an executable file that can be processed by the natural-language generator 271. The sentence planner may determine the organization of the communication content to make it human understandable. The surface realization component may determine specific words to use, the sequence of the sentences, and the style of the communication content. The UI payload generator 272 may determine a preferred modality of the communication content to be presented to the user. In particular embodiments, the CU composer 270 may communicate with the privacy check module 245 to make sure the generation of the communication content follows the privacy policies. In particular embodiments, the CU composer 270 may retrieve a user profile from the user context engine 225 when generating the communication content and determining the modality of the communication content. As a result, the communication content may be more natural, personalized, and context-aware for the user. As an example and not by way of limitation, the user profile may indicate that the user likes short sentences in conversations so the generated communication content may be based on short sentences. As another example and not by way of limitation, the contextual information associated with the user profile may indicated that the user is using a device that only outputs audio signals so the UI payload generator 272 may determine the modality of the communication content as audio. More information on natural-language generation may be found in U.S. patent application Ser. No. 15/967,279, filed 30 Apr. 2018, and U.S. patent application Ser. No. 15/966,455, filed 30 Apr. 2018, each of which is incorporated by reference.

In particular embodiments, the CU composer 270 may send the generated communication content to the assistant xbot 215. In particular embodiments, the assistant xbot 215 may send the communication content to the messaging platform 205. The messaging platform 205 may further send the communication content to the client system 130 via the assistant application 136. In alternative embodiments, the assistant xbot 215 may send the communication content to a text-to-speech (TTS) module 275. The TTS module 275 may convert the communication content to an audio clip. The TTS module 275 may further send the audio clip to the client system 130 via the assistant application 136.

In particular embodiments, the assistant xbot 215 may interact with a proactive inference layer 280 without receiving a user input. The proactive inference layer 280 may infer user interests and preferences based on the user profile that is retrieved from the user context engine 225. In particular embodiments, the proactive inference layer 280 may further communicate with proactive agents 285 regarding the inference. The proactive agents 285 may execute proactive tasks based on the inference. As an example and not by way of limitation, the proactive tasks may comprise sending content objects or providing services to the user. In particular embodiments, each proactive task may be associated with an agenda item. The agenda item may comprise a recurring item such as a daily digest. The agenda item may also comprise a one-time item. In particular embodiments, a proactive agent 285 may retrieve the user profile from the user context engine 225 when executing the proactive task. Therefore, the proactive agent 285 may execute the proactive task in a personalized and context-aware manner. As an example and not by way of limitation, the proactive inference layer may infer that the user likes the band Maroon 5 and the proactive agent 285 may generate a recommendation of Maroon 5's new song/album to the user.

In particular embodiments, the proactive agent 285 may generate candidate entities associated with the proactive task based on a user profile. The generation may be based on a straightforward backend query using deterministic filters to retrieve the candidate entities from a structured data store. The generation may be alternatively based on a machine-learning model that is trained based on the user profile, entity attributes, and relevance between users and entities. As an example and not by way of limitation, the machine-learning model may be based on support vector machines (SVM). As another example and not by way of limitation, the machine-learning model may be based on a regression model. As another example and not by way of limitation, the machine-learning model may be based on a deep convolutional neural network (DCNN). In particular embodiments, the proactive agent 285 may also rank the generated candidate entities based on the user profile and the content associated with the candidate entities. The ranking may be based on the similarities between a user's interests and the candidate entities. As an example and not by way of limitation, the assistant system 140 may generate a feature vector representing a user's interest and feature vectors representing the candidate entities. The assistant system 140 may then calculate similarity scores (e.g., based on cosine similarity) between the feature vector representing the user's interest and the feature vectors representing the candidate entities. The ranking may be alternatively based on a ranking model that is trained based on user feedback data.

In particular embodiments, the proactive task may comprise recommending the candidate entities to a user. The proactive agent 285 may schedule the recommendation, thereby associating a recommendation time with the recommended candidate entities. The recommended candidate entities may be also associated with a priority and an expiration time. In particular embodiments, the recommended candidate entities may be sent to a proactive scheduler. The proactive scheduler may determine an actual time to send the recommended candidate entities to the user based on the priority associated with the task and other relevant factors (e.g., clicks and impressions of the recommended candidate entities). In particular embodiments, the proactive scheduler may then send the recommended candidate entities with the determined actual time to an asynchronous tier. The asynchronous tier may temporarily store the recommended candidate entities as a job. In particular embodiments, the asynchronous tier may send the job to the dialog engine 235 at the determined actual time for execution. In alternative embodiments, the asynchronous tier may execute the job by sending it to other surfaces (e.g., other notification services associated with the social-networking system 160). In particular embodiments, the dialog engine 235 may identify the dialog intent, state, and history associated with the user. Based on the dialog intent, the dialog engine 235 may select some candidate entities among the recommended candidate entities to send to the client system 130. In particular embodiments, the dialog state and history may indicate if the user is engaged in an ongoing conversation with the assistant xbot 215. If the user is engaged in an ongoing conversation and the priority of the task of recommendation is low, the dialog engine 235 may communicate with the proactive scheduler to reschedule a time to send the selected candidate entities to the client system 130. If the user is engaged in an ongoing conversation and the priority of the task of recommendation is high, the dialog engine 235 may initiate a new dialog session with the user in which the selected candidate entities may be presented. As a result, the interruption of the ongoing conversation may be prevented. When it is determined that sending the selected candidate entities is not interruptive to the user, the dialog engine 235 may send the selected candidate entities to the CU composer 270 to generate a personalized and context-aware communication content comprising the selected candidate entities, subject to the user's privacy settings. In particular embodiments, the CU composer 270 may send the communication content to the assistant xbot 215 which may then send it to the client system 130 via the messaging platform 205 or the TTS module 275. More information on proactively assisting users may be found in U.S. patent application Ser. No. 15/967,193, filed 30 Apr. 2018, and U.S. patent application Ser. No. 16/036,827, filed 16 Jul. 2018, each of which is incorporated by reference.

In particular embodiments, the assistant xbot 215 may communicate with a proactive agent 285 in response to a user input. As an example and not by way of limitation, the user may ask the assistant xbot 215 to set up a reminder. The assistant xbot 215 may request a proactive agent 285 to set up such reminder and the proactive agent 285 may proactively execute the task of reminding the user at a later time.

In particular embodiments, the assistant system 140 may comprise a summarizer 290. The summarizer 290 may provide customized news feed summaries to a user. In particular embodiments, the summarizer 290 may comprise a plurality of meta agents. The plurality of meta agents may use the first-party agents 250, third-party agents 255, or proactive agents 285 to generated news feed summaries. In particular embodiments, the summarizer 290 may retrieve user interests and preferences from the proactive inference layer 280. The summarizer 290 may then retrieve entities associated with the user interests and preferences from the entity resolution module 240. The summarizer 290 may further retrieve a user profile from the user context engine 225. Based on the information from the proactive inference layer 280, the entity resolution module 240, and the user context engine 225, the summarizer 290 may generate personalized and context-aware summaries for the user. In particular embodiments, the summarizer 290 may send the summaries to the CU composer 270. The CU composer 270 may process the summaries and send the processing results to the assistant xbot 215. The assistant xbot 215 may then send the processed summaries to the client system 130 via the messaging platform 205 or the TTS module 275. More information on summarization may be found in U.S. patent application Ser. No. 15/967,290, filed 30 Apr. 2018, which is incorporated by reference.

Figure 3:
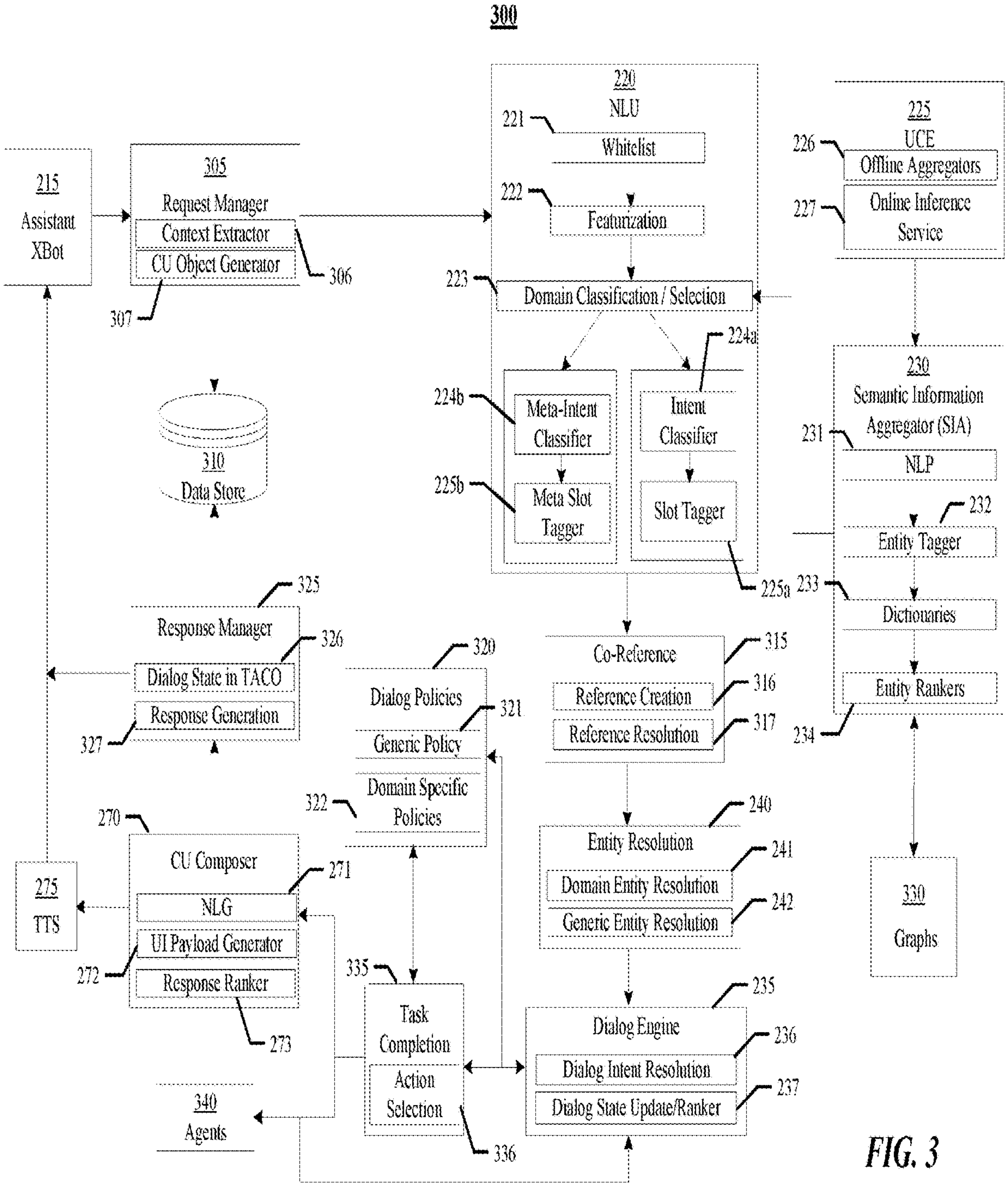
FIG. 3 illustrates an example diagram flow of responding to a user request by the assistant system.

FIG. 3 illustrates an example diagram flow of responding to a user request by the assistant system 140. In particular embodiments, the assistant xbot 215 may access a request manager 305 upon receiving the user request. The request manager 305 may comprise a context extractor 306 and a conversational understanding object generator (CU object generator) 307. The context extractor 306 may extract contextual information associated with the user request. The context extractor 306 may also update contextual information based on the assistant application 136 executing on the client system 130. As an example and not by way of limitation, the update of contextual information may comprise content items are displayed on the client system 130. As another example and not by way of limitation, the update of contextual information may comprise whether an alarm is set on the client system 130. As another example and not by way of limitation, the update of contextual information may comprise whether a song is playing on the client system 130. The CU object generator 307 may generate particular content objects relevant to the user request. The content objects may comprise dialog-session data and features associated with the user request, which may be shared with all the modules of the assistant system 140. In particular embodiments, the request manager 305 may store the contextual information and the generated content objects in data store 310 which is a particular data store implemented in the assistant system 140.

In particular embodiments, the request manger 305 may send the generated content objects to the NLU module 220. The NLU module 220 may perform a plurality of steps to process the content objects. At step 221, the NLU module 220 may generate a whitelist for the content objects. In particular embodiments, the whitelist may comprise interpretation data matching the user request. At step 222, the NLU module 220 may perform a featurization based on the whitelist. At step 223, the NLU module 220 may perform domain classification/selection on user request based on the features resulted from the featurization to classify the user request into predefined domains. The domain classification/selection results may be further processed based on two related procedures. At step 224*a*, the NLU module 220 may process the domain classification/selection result using an intent classifier. The intent classifier may determine the user's intent associated with the user request. In particular embodiments, there may be one intent classifier for each domain to determine the most possible intents in a given domain. As an example and not by way of limitation, the intent classifier may be based on a machine-learning model that may take the domain classification/selection result as input and calculate a probability of the input being associated with a particular predefined intent. At step 224*b*, the NLU module may process the domain classification/selection result using a meta-intent classifier. The meta-intent classifier may determine categories that describe the user's intent. In particular embodiments, intents that are common to multiple domains may be processed by the meta-intent classifier. As an example and not by way of limitation, the meta-intent classifier may be based on a machine-learning model that may take the domain classification/selection result as input and calculate a probability of the input being associated with a particular predefined meta-intent. At step 225*a*, the NLU module 220 may use a slot tagger to annotate one or more slots associated with the user request. In particular embodiments, the slot tagger may annotate the one or more slots for the n-grams of the user request. At step 225*b*, the NLU module 220 may use a meta slot tagger to annotate one or more slots for the classification result from the meta-intent classifier. In particular embodiments, the meta slot tagger may tag generic slots such as references to items (e.g., the first), the type of slot, the value of the slot, etc. As an example and not by way of limitation, a user request may comprise "change 500 dollars in my account to Japanese yen." The intent classifier may take the user request as input and formulate it into a vector. The intent classifier may then calculate probabilities of the user request being associated with different predefined intents based on a vector comparison between the vector representing the user request and the vectors representing different predefined intents. In a similar manner, the slot tagger may take the user request as input and formulate each word into a vector. The intent classifier may then calculate probabilities of each word being associated with different predefined slots based on a vector comparison between the vector representing the word and the vectors representing different predefined slots. The intent of the user may be classified as "changing money". The slots of the user request may comprise "500", "dollars", "account", and "Japanese yen". The meta-intent of the user may be classified as "financial service". The meta slot may comprise "finance".

In particular embodiments, the NLU module 220 may improve the domain classification/selection of the content objects by extracting semantic information from the semantic information aggregator 230. In particular embodiments, the semantic information aggregator 230 may aggregate semantic information in the following way. The semantic information aggregator 230 may first retrieve information from the user context engine 225. In particular embodiments, the user context engine 225 may comprise offline aggregators 226 and an online inference service 227. The offline aggregators 226 may process a plurality of data associated with the user that are collected from a prior time window. As an example and not by way of limitation, the data may include news feed posts/comments, interactions with news feed posts/comments, Instagram posts/comments, search history, etc. that are collected from a prior 90-day window. The processing result may be stored in the user context engine 225 as part of the user profile. The online inference service 227 may analyze the conversational data associated with the user that are received by the assistant system 140 at a current time. The analysis result may be stored in the user context engine 225 also as part of the user profile. In particular embodiments, both the offline aggregators 226 and online inference service 227 may extract personalization features from the plurality of data. The extracted personalization features may be used by other modules of the assistant system 140 to better understand user input. In particular embodiments, the semantic information aggregator 230 may then process the retrieved information, i.e., a user profile, from the user context engine 225 in the following steps. At step 231, the semantic information aggregator 230 may process the retrieved information from the user context engine 225 based on natural-language processing (NLP). In particular embodiments, the semantic information aggregator 230 may tokenize text by text normalization, extract syntax features from text, and extract semantic features from text based on NLP. The semantic information aggregator 230 may additionally extract features from contextual information, which is accessed from dialog history between a user and the assistant system 140. The semantic information aggregator 230 may further conduct global word embedding, domain-specific embedding, and/or dynamic embedding based on the contextual information. At step 232, the processing result may be annotated with entities by an entity tagger. Based on the annotations, the semantic information aggregator 230 may generate dictionaries for the retrieved information at step 233. In particular embodiments, the dictionaries may comprise global dictionary features which can be updated dynamically offline. At step 234, the semantic information aggregator 230 may rank the entities tagged by the entity tagger. In particular embodiments, the semantic information aggregator 230 may communicate with different graphs 330 including social graph, knowledge graph, and concept graph to extract ontology data that is relevant to the retrieved information from the user context engine 225. In particular embodiments, the semantic information aggregator 230 may aggregate the user profile, the ranked entities, and the information from the graphs 330. The semantic information aggregator 230 may then send the aggregated information to the NLU module 220 to facilitate the domain classification/selection.

In particular embodiments, the output of the NLU module 220 may be sent to a co-reference module 315 to interpret references of the content objects associated with the user request. In particular embodiments, the co-reference module 315 may be used to identify an item to which the user request refers. The co-reference module 315 may comprise reference creation 316 and reference resolution 317. In particular embodiments, the reference creation 316 may create references for entities determined by the NLU module 220. The reference resolution 317 may resolve these references accurately. As an example and not by way of limitation, a user request may comprise "find me the nearest supermarket and direct me there". The co-reference module 315 may interpret "there" as "the nearest supermarket". In particular embodiments, the co-reference module 315 may access the user context engine 225 and the dialog engine 235 when necessary to interpret references with improved accuracy.

In particular embodiments, the identified domains, intents, meta-intents, slots, and meta slots, along with the resolved references may be sent to the entity resolution module 240 to resolve relevant entities. The entity resolution module 240 may execute generic and domain-specific entity resolution. In particular embodiments, the entity resolution module 240 may comprise domain entity resolution 241 and generic entity resolution 242. The domain entity resolution 241 may resolve the entities by categorizing the slots and meta slots into different domains. In particular embodiments, entities may be resolved based on the ontology data extracted from the graphs 330. The ontology data may comprise the structural relationship between different slots/meta-slots and domains. The ontology may also comprise information of how the slots/meta-slots may be grouped, related within a hierarchy where the higher level comprises the domain, and subdivided according to similarities and differences. The generic entity resolution 242 may resolve the entities by categorizing the slots and meta slots into different generic topics. In particular embodiments, the resolving may be also based on the ontology data extracted from the graphs 330. The ontology data may comprise the structural relationship between different slots/meta-slots and generic topics. The ontology may also comprise information of how the slots/meta-slots may be grouped, related within a hierarchy where the higher level comprises the topic, and subdivided according to similarities and differences. As an example and not by way of limitation, in response to the input of an inquiry of the advantages of a Tesla car, the generic entity resolution 242 may resolve a Tesla car as vehicle and the domain entity resolution 241 may resolve the Tesla car as electric car.

In particular embodiments, the output of the entity resolution module 240 may be sent to the dialog engine 235 to forward the flow of the conversation with the user. The dialog engine 235 may comprise dialog intent resolution 236 and dialog state update/ranker 237. In particular embodiments, the dialog intent resolution 236 may resolve the user intent associated with the current dialog session based on dialog history between the user and the assistant system 140. The dialog intent resolution 236 may map intents determined by the NLU module 220 to different dialog intents. The dialog intent resolution 236 may further rank dialog intents based on signals from the NLU module 220, the entity resolution module 240, and dialog history between the user and the assistant system 140. In particular embodiments, the dialog state update/ranker 237 may update/rank the dialog state of the current dialog session. As an example and not by way of limitation, the dialog state update/ranker 237 may update the dialog state as “completed” if the dialog session is over. As another example and not by way of limitation, the dialog state update/ranker 237 may rank the dialog state based on a priority associated with it.

In particular embodiments, the dialog engine 235 may communicate with a task completion module 335 about the dialog intent and associated content objects. In particular embodiments, the task completion module 335 may rank different dialog hypotheses for different dialog intents. The task completion module 335 may comprise an action selection component 336. In particular embodiments, the dialog engine 235 may additionally check against dialog policies 320 regarding the dialog state. In particular embodiments, a dialog policy 320 may comprise a data structure that describes an execution plan of an action by an agent 340. An agent 340 may select among registered content providers to complete the action. The data structure may be constructed by the dialog engine 235 based on an intent and one or more slots associated with the intent. A dialog policy 320 may further comprise multiple goals related to each other through logical operators. In particular embodiments, a goal may be an outcome of a portion of the dialog policy and it may be constructed by the dialog engine 235. A goal may be represented by an identifier (e.g., string) with one or more named arguments, which parameterize the goal. As an example and not by way of limitation, a goal with its associated goal argument may be represented as {confirm_artist, args: {artist: “Madonna”}}. In particular embodiments, a dialog policy may be based on a tree-structured representation, in which goals are mapped to leaves of the tree. In particular embodiments, the dialog engine 235 may execute a dialog policy 320 to determine the next action to carry out. The dialog policies 320 may comprise generic policy 321 and domain specific policies 322, both of which may guide how to select the next system action based on the dialog state. In particular embodiments, the task completion module 335 may communicate with dialog policies 320 to obtain the guidance of the next system action. In particular embodiments, the action selection component 336 may therefore select an action based on the dialog intent, the associated content objects, and the guidance from dialog policies 320.

In particular embodiments, the output of the task completion module 335 may be sent to the CU composer 270. In alternative embodiments, the selected action may require one or more agents 340 to be involved. As a result, the task completion module 335 may inform the agents 340 about the selected action. Meanwhile, the dialog engine 235 may receive an instruction to update the dialog state. As an example and not by way of limitation, the update may comprise awaiting agents' response. In particular embodiments, the CU composer 270 may generate a communication content for the user using the NLG 271 based on the output of the task completion module 335. In particular embodiments, the NLG 271 may use different language models and/or language templates to generate natural language outputs. The generation of natural language outputs may be application specific. The generation of natural language outputs may be also personalized for each user. The CU composer 270 may also determine a modality of the generated communication content using the UI payload generator 272. Since the generated communication content may be considered as a response to the user request, the CU composer 270 may additionally rank the generated communication content using a response ranker 273. As an example and not by way of limitation, the ranking may indicate the priority of the response.

In particular embodiments, the output of the CU composer 270 may be sent to a response manager 325. The response manager 325 may perform different tasks including storing/updating the dialog state 326 retrieved from data store 310 and generating responses 327. In particular embodiments, the output of CU composer 270 may comprise one or more of natural-language strings, speech, or actions with parameters. As a result, the response manager 325 may determine what tasks to perform based on the output of CU composer 270. In particular embodiments, the generated response and the communication content may be sent to the assistant xbot 215. In alternative embodiments, the output of the CU composer 270 may be additionally sent to the TTS module 275 if the determined modality of the communication content is audio. The speech generated by the TTS module 275 and the response generated by the response manager 325 may be then sent to the assistant xbot 215.

Personalized Gesture Recognition for User Interaction

In particular embodiments, the assistant system 140 may train a personalized gesture-classification model. The training may include receiving a plurality of input tuples each comprising a gesture-input and a speech-input, determining a plurality of intents based on the speech-inputs by a natural-language understanding (NLU) 220 module, accessing a general gesture-classification model, associating the intents with their respective gesture-inputs, and training a personalized gesture-classification model based on the associations between the intents and the gesture-inputs, and also the general gesture-classification model. In particular embodiments, the general gesture-classification model may be generated by crowdsourcing with respect to a large number of standard gestures. However, the general gesture-classification model may be unable to determine the correct intent of a particular user's gesture, especially if the user is using a non-standard gesture or a gesture that is typically used for a different intent. Therefore, the training of the personalized gesture-classification model may additionally leverage the informative cues from the user's own input comprising both speech and gestures on top of the general gesture-classification model. Besides using the speech-input separately to assist in the training of the personalized gesture-classification model, the assistant system 140 may alternatively train the personalized gesture-classification model by utilizing the speech-inputs and gesture-inputs jointly. Once the personalized gesture-classification model is trained, the assistant system 140 may use it to determine a user's intents corresponding to his/her own gestures in the future. Although this disclosure describes training particular gesture-classification models via particular systems in particular manners, this disclosure contemplates describes training any suitable gesture-classification model via any suitable system in any suitable manner.

Figure 4A:
FIGS. 4A-4C illustrate example gestures.
Figure 4B:
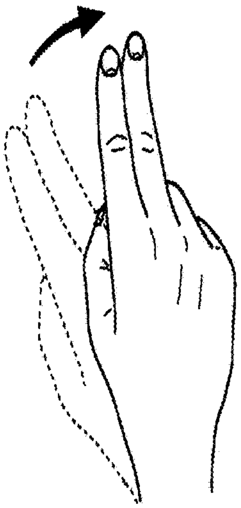
Figure 4C:

FIG. 4 illustrates example gestures. In particular embodiments, the assistant system 140 may access, from a data store, a plurality of input tuples associated with a first user. Each input tuple may comprise a gesture-input and a corresponding speech-input. The gesture-input and speech-input may be captured by, for example, an assistant device, a virtual reality (VR) headset or augment reality (AR) smart glasses associated with the assistant system 140 (which are not illustrated in FIG. 4). As an example and not by way of limitation, an input may comprise a "no" gesture as illustrated in FIG. 4A (i.e., the user is holding up his hand in a substantially vertical position, palm facing away, with fingers all extended and substantially together) and a speech-input of "stop." As another example and not by way of limitation, an input may comprise a "swipe" gesture as illustrated in FIG. 4B (i.e., the user's index and middle fingers are extended, and the hand is moving in an arc from left-to-right) and a speech-input of "next." As yet another example and not by way of limitation, an input may comprise a "pinch" gestures as illustrated in FIG. 4C (i.e., the user's thumb and index fingers are moving towards each other from an extended position with respect to each other) and a speech-input of "pick up." These input tuples of gesture-inputs and corresponding speech-inputs may be generated based on one or more of crowdsourcing (i.e., a general population were asked to provide gesture-inputs and corresponding speech-inputs) or historical user interactions with the assistant system 140. Although this disclosure describes accessing particular gesture and speech inputs in a particular manner, this disclosure contemplates accessing any suitable gesture and speech inputs in any suitable manner.

In particular embodiments, the assistant system 140 may then determine, by a natural-language understanding (NLU) module 220, a plurality of intents corresponding to the plurality of speech-inputs, respectively. As an example and not by way of limitation, the NLU module 220 may determine an intent of the aforementioned speech-input of "stop" as stopping a task being executed by the assistant system 140, e.g., stopping playing music. As another example and not by way of limitation, the NLU module 220 may determine an intent of the aforementioned speech-input of "next" as choosing the next content object suggested by the assistant system 140, e.g., next image. As another example and not by way of limitation, the NLU module 220 may determine an intent of the aforementioned speech-input of "pick up" as picking up an object in a VR game or an AR view of a room. The assistant system 140 may then generate, for the plurality of gesture-inputs, a plurality of feature representations based on one or more machine-learning models. A feature representation may be a piece of information which is relevant for solving a computational task related to a certain application, e.g., gesture recognition. As an example and not by way of limitation, the feature representation for a gesture may be generated based on convolutional neural networks, shape and texture features from 2D images and videos associated with the gesture, or depth images associated with the gesture. In particular embodiments, the assistant system 140 may then determine a plurality of gesture identifiers for the plurality of gesture-inputs, respectively, based on their respective feature representations. The assistant system 140 may then associate the plurality of intents with the plurality of gesture identifiers, respectively. In particular embodiments, the assistant system 140 may further train, for the first user, a personalized gesture-classification model based on the plurality of feature representations of their respective gesture-inputs and the associations between the plurality of intents and their respective gesture identifiers.

Figure 5:
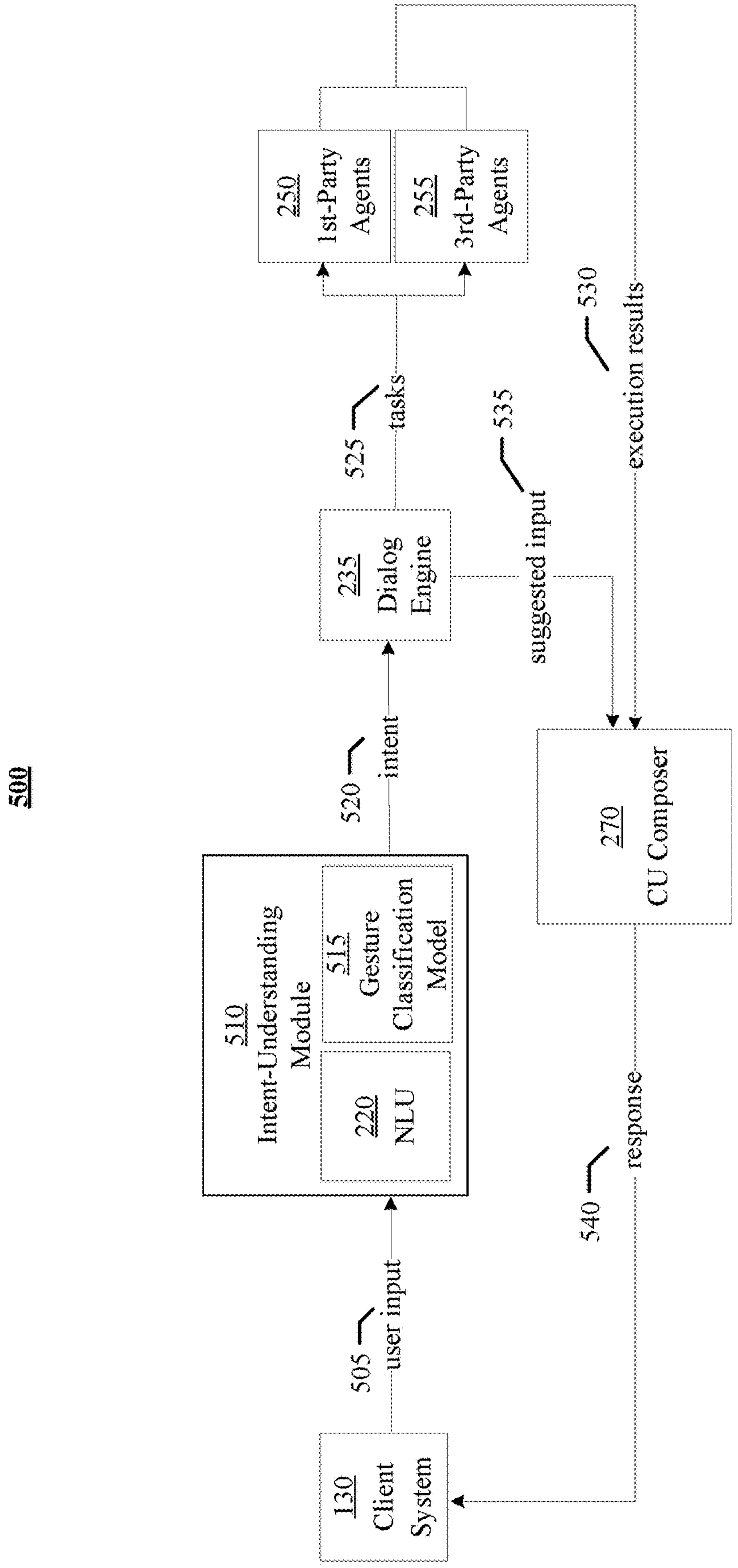
FIG. 5 illustrates an example workflow of processing a user input comprising a gesture-input.

FIG. 5 illustrates an example workflow of processing a user input comprising a gesture-input. A gesture-input may be an input which is based on a movement of part of the body, especially a hand or the head, to express an idea or meaning. The gesture-inputs may be in the form of image information, video information, motion information, or any combination thereof. In particular embodiments, the assistant system 140 may receive a user input 505 by a user from a client system 130. The assistant system 140 may send the user input 505 to an intent-understanding module 510. The intent-understanding module 510 may comprise a natural-language understanding (NLU) module 220 and a gesture-classification model 515. The gesture-classification model 515 may be a machine-learning model trained offline to recognize different categories of gestures performed by users. As an example and not by way of limitation, a gesture classification model 515 may be based on one or more of convolutional neural networks, tensor flow, or hidden Markov models. Based on the user input 505, the intent-understanding module 510 may use different components to determine an intent 520 associated with the user input 505. If the user input 505 comprises a text-input or a speech-input, the intent-understanding module 510 may use the NLU module 220 to determine the intent 520. If the user input 505 comprises a gesture-input, the intent-understanding module 510 may use the gesture-classification model 515 to determine the intent 520. The determined intent 520 may be associated with a confidence score indicating how confident the assistant system 140 is in determining the user's intent 520. In particular embodiments, the confidence score may be determined based on how closely the user's text-input or speech-input matches a known input for a given intent 520. As an example and not by way of limitation, the closeness may be based on string similarity between the text-input and the known input (text). The assistant system 140 may then send the intent 520 with its confidence score to the dialog engine 235. If the confidence score is above a threshold score, the dialog engine 235 may determine one or more tasks 525 corresponding to the intent 520 and send them to either 1st-party agents 250 or 3rd-party agents 255 for executing the tasks 525. The execution results 530 may be sent to the CU composer 270. If the confidence score is below a threshold score, the dialog engine 235 may determine one or more suggested inputs 535 for the user, which may help the assistant system 140 determine the user's intent with a higher confidence score. The dialog engine 235 may send the suggested inputs 535 to the CU composer 270. Based on the execution results 530 or the suggested inputs 535, the CU composer 270 may generate a response 540. The response 540 may be in different modalities comprising one or more of a text, an image, a video, or an animation of a gesture. The CU composer 270 may further send the response 540 to the client system 130. Although this disclosure describes processing a user input via particular systems in particular manners, this disclosure contemplates describes processing any suitable user input via any suitable system in any suitable manner.

In particular embodiments, the training of the personalized gesture-classification model may be based on a general gesture-classification model. The assistant system 140 may access, from the data store, a general gesture-classification model corresponding to a general user population. Accordingly, training the personalized gesture-classification model may be further based on the general gesture-classification model. In particular embodiments, the general user population may correspond to a plurality of second users. As an example and not by way of limitation, the second users may be from a general user population (e.g., people across the world) or a defined user population (e.g., people in the USA). In particular embodiments, the general gesture-classification model may be trained based on a plurality of gesture-inputs from the general user population. As an example and not by way of limitation, the plurality of gesture-inputs may comprise standard gestures performed by users of the general population. As a result, if a user performs one of these standard gestures, the general gesture-classification model may be able to recognize it and determine its corresponding intent 520. The general gesture-classification model may be the basis for a personalized gesture-classification model, which may have the capacity to recognize a user's gesture if it is performed in consistence with its corresponding standard gesture. Although this disclosure describes particular general models in particular manners, this disclosure contemplates describes any suitable general model in any suitable manner.

In particular embodiments, the assistant system 140 may first use the general gesture-classification model as a default model to determine the category of a received gesture-input and its corresponding intent 520. If the assistant system 140 successfully determines the intent 520, it may execute a corresponding task 525. If the assistant system 140 cannot determine the user's intent 520, the assistant system 140 may ask the user to perform the gesture again and simultaneously speak to the assistant system 140 regarding his/her intent 520. After that, the assistant system 140 may start the training process of the personalized gesture-classification model while simultaneously collecting training data from the user's speech and gestures. Although this disclosure describes using particular gesture-classification models via particular systems in particular manners, this disclosure contemplates describes using any suitable gesture-classification model via any suitable system in any suitable manner.

In particular embodiments, the assistant system 140 may train the personalized gesture-classification model in the following way. The assistant system may first generate, by one or more automatic speech recognition (ASR) modules 210, a plurality of text-inputs for the plurality of speech-inputs, respectively. Accordingly, determining the plurality of intents 520 corresponding to the plurality of speech-inputs, respectively, may be based on the plurality of text-inputs of the respective speech-inputs. In particular embodiments, the assistant system may use the natural-language understanding (NLU) module 220 to classify the text-inputs to obtain corresponding intents 520. The assistant system 140 may then generate feature representations for the gesture-inputs based on one or more machine-learning models. As an example and not by way of limitation, the gesture-inputs may comprise images, videos, motion data, skeleton data, thermal data, etc., that contain gestures. In particular embodiments, the one or more machine-learning models may be based on one or more of a neural network model or a long-short term memory (LSTM) model. The assistant system 140 may additionally assign different gesture identifiers to the feature representations corresponding to the gesture-inputs. In particular embodiments, the assistant system 140 may then associate the intents 520 with the gesture identifiers. The associations between the plurality of intents 520 and their respective gesture identifiers may be used to train the personalized gesture-classification model. Training the personalized gesture-classification model based on both the user's speech-inputs and gesture-inputs may be an effective solution for addressing the technical challenge of enabling the personalized gesture-classification model to identify a user's intent 520 from a user's personal gesture, as the user's intents 520 may be learned from the speech-inputs and association between such intents 520 and gesture-inputs may be generated for further utilization during the training of the personalized gesture-classification model. In particular embodiments, the personalized gesture-classification model may be based on convolutional neural networks or recurrent neural networks. Repeated observation of coincidence speech intents and gestures, whether generated intentionally or sub-consciously by the first user, may result in more and more training data. Meanwhile, the personalized gesture-classification model may be gradually optimized as more and more training data are used. As a result, the personalize gesture-classification model may discover new gestures from a user and associate them with meanings (i.e., intents 520). Training the personalized gesture-classification model based on both speech-inputs and gesture-inputs may be more effective in gesture classification for a particular user. As an example and not by way of limitation, a user may perform a "no" gesture as illustrated in FIG. 4A, but the intent 520 may be actually "next", which is normally associated with the "swipe" gesture as illustrated in FIG. 4B. Using a standard gesture-classification model may determine a wrong intent accordingly. By contrast, as the personalized gesture-classification model uses data based on the user's personal way of performing such gesture, it may effectively determine an intent 520 of "next" when the user performs a "no" gesture as illustrated in FIG. 4A. As another example and not by way of limitation, a user may perform a "swipe" gesture as illustrated in FIG. 4B, but the intent 520 may be not "next" but actually "rewind a video". Similarly, using a standard gesture-classification model may determine a wrong intent but the personalized gesture-classification model may effectively determine an intent 520 of "rewind a video" when the user performs a "swipe" gesture as illustrated in FIG. 4B. As another example and not by way of limitation, a user may perform a "pinch" gesture as illustrated in FIG. 4C, but the intent 520 may be not "pick up" but actually "zoom out". Again, using a standard gesture-classification model may determine a wrong intent while the personalized gesture-classification model may effectively determine an intent 520 of "zoom out" when the user performs a "pinch" gesture as illustrated in FIG. 4C. Although this disclosure describes training particular gesture-classification models in particular manners, this disclosure contemplates describes training any suitable gesture-classification model in any suitable manner.

In particular embodiments, the assistant system may generate feature representations for gesture-inputs by considering a variety of information. In particular embodiments, generating each feature representation for each gesture-input may comprise dividing the gesture-input into one or more components and modeling the one or more components into the feature representation for the gesture-input. The components may be considered as partial gestures. In particular embodiments, generating each feature representation for each gesture-input may comprise determining temporal information associated with the gesture-input and modeling the temporal information into the feature representation for the gesture-input. As an example and not by way of limitation, a user may roll his/her eyes before doing a gesture of "no" as illustrated in FIG. 4A. Hence, the assistant system 140 may take into account the temporal information of eye-rolling which happened before the "no" gesture when generating the feature representation to help determine the intent 520 of denial. Modeling components of a gesture-input and temporal information associated with the gesture-input into the feature representation may be an effective solution for addressing the technical challenge of generating reliable feature representations for gesture-inputs since dividing a gesture-input into components may help distinguish a gesture from another and temporal information may carry contextual information indicating a user's intent 520, which may be useful for gesture classification. Although this disclosure describes generating particular feature representations in particular manners, this disclosure contemplates describes generating any suitable feature representation in any suitable manner.

In particular embodiments, the assistant system 140 may train the personalized gesture-classification model by leveraging the speech-inputs and gesture-inputs jointly. The assistant system 140 may extract text-inputs from the speech-inputs by ASR modules 210. The assistant system 140 may then generate feature representations for both the text-inputs and the gesture-inputs. After the feature representations are generated, the assistant system 140 may determine weights for the text-inputs and weights for the gesture-inputs, respectively. In particular embodiments, these inputs and their respective weights may be further fed into a deep neural network framework to train the personalized gesture-classification model. In particular embodiments, the assistant system 140 may further utilize user feedback when training the personalized gesture-classification model. The dialog engine 235 may seek user feedback by way of suggested input 535, through which additional training data may be also obtained. To be more specific, the dialog engine 235 may seek confirmation or disambiguation of gestures with low confidence. The dialog engine 235 may use text or speech to ask the user for confirmation or disambiguation of gestures which may be included in the suggested input 535. As a result, the confirmation or selection from the user may be used as additional signal for training the personalized gesture-classification model. Although this disclosure describes training particular gesture-classification models in particular manners, this disclosure contemplates describes training any suitable gesture-classification model in any suitable manner.

In particular embodiments, the personalized gesture-classification model may automatically associate a gesture-input with an intent 520 at runtime. In particular embodiments, the assistant system 140 may receive, from a client system 130 associated with the first user, a new gesture-input from the first user. The assistant system 140 may then determine, for the new gesture-input, an intent 520 corresponding to the new gesture-input based on the personalized gesture-classification model. In particular embodiments, the assistant system 140 may further execute one or more tasks 525 based on the determined intent 520. As a result, the assistant system 140 may have a technical advantage of enriching user experience with the assistant system 140 by enabling the user to interact with the assistant system 140 with gestures besides traditional input such as text and voice, for which the assistant system 140 may accurately recognize a user's gesture and execute tasks 525 corresponding to the recognized gesture. Although this disclosure describes using particular gesture-classification models in particular manners, this disclosure contemplates describes using any suitable gesture-classification model in any suitable manner.

Figure 6:
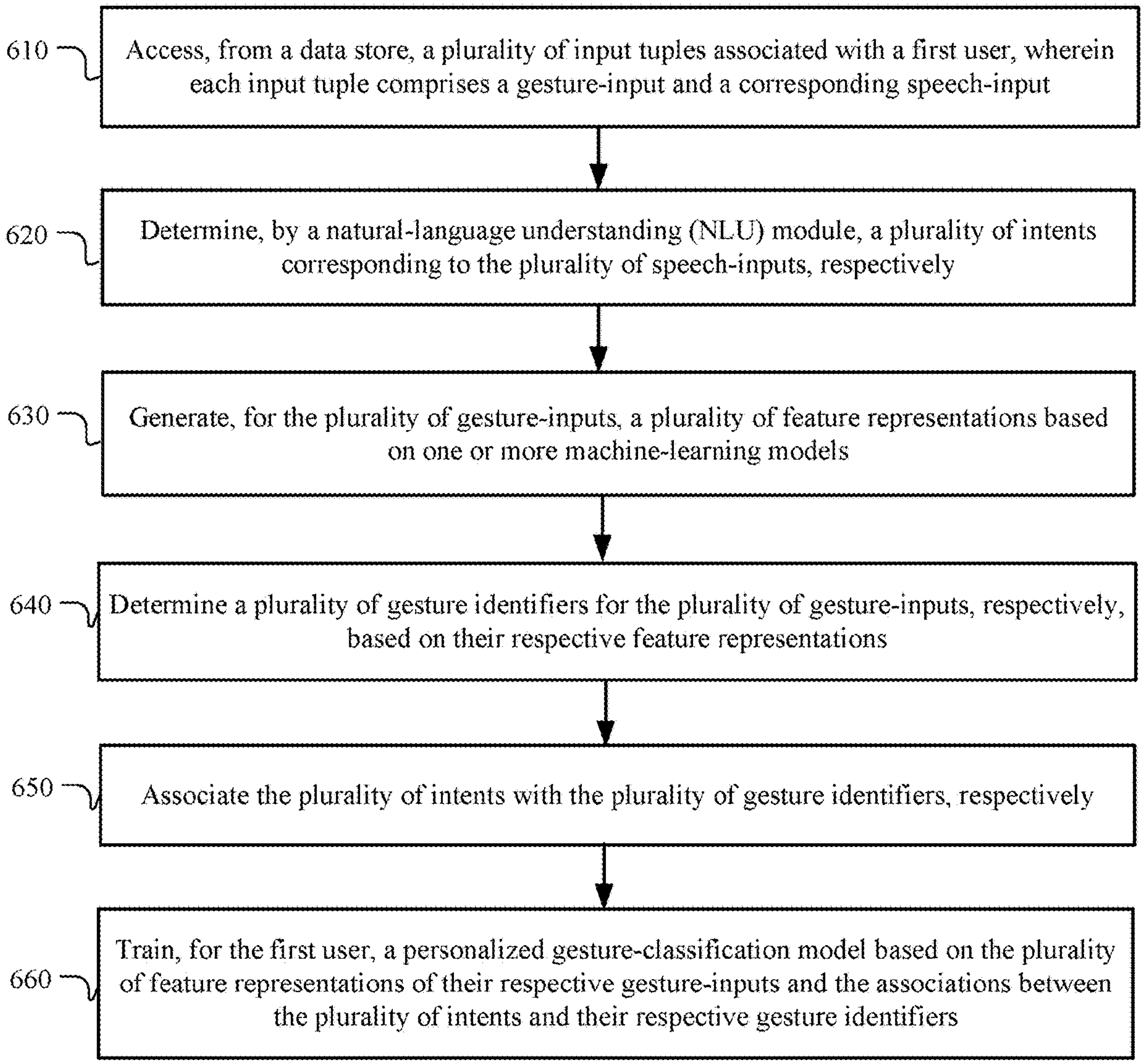
FIG. 6 illustrates an example method for training a personalized gesture-classification model.

FIG. 6 illustrates an example method 600 for training a personalized gesture-classification model. The method may begin at step 610, where the assistant system 140 may access, from a data store, a plurality of input tuples associated with a first user, wherein each input tuple comprises a gesture-input and a corresponding speech-input. At step 620, the assistant system 140 may determine, by a natural-language understanding (NLU) module 220, a plurality of intents 520 corresponding to the plurality of speech-inputs, respectively. At step 630, the assistant system 140 may generate, for the plurality of gesture-inputs, a plurality of feature representations based on one or more machine-learning models. At step 640, the assistant system 140 may determine a plurality of gesture identifiers for the plurality of gesture-inputs, respectively, based on their respective feature representations. At step 650, the assistant system 140 may associate the plurality of intents 520 with the plurality of gesture identifiers, respectively. At step 660, the assistant system 140 may train, for the first user, a personalized gesture-classification model based on the plurality of feature representations of their respective gesture-inputs and the associations between the plurality of intents 520 and their respective gesture identifiers. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for training a personalized gesture-classification model, including the particular steps of the method of FIG. 6, this disclosure contemplates any suitable method for training a personalized gesture-classification model, including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Social Graphs

Figure 7:
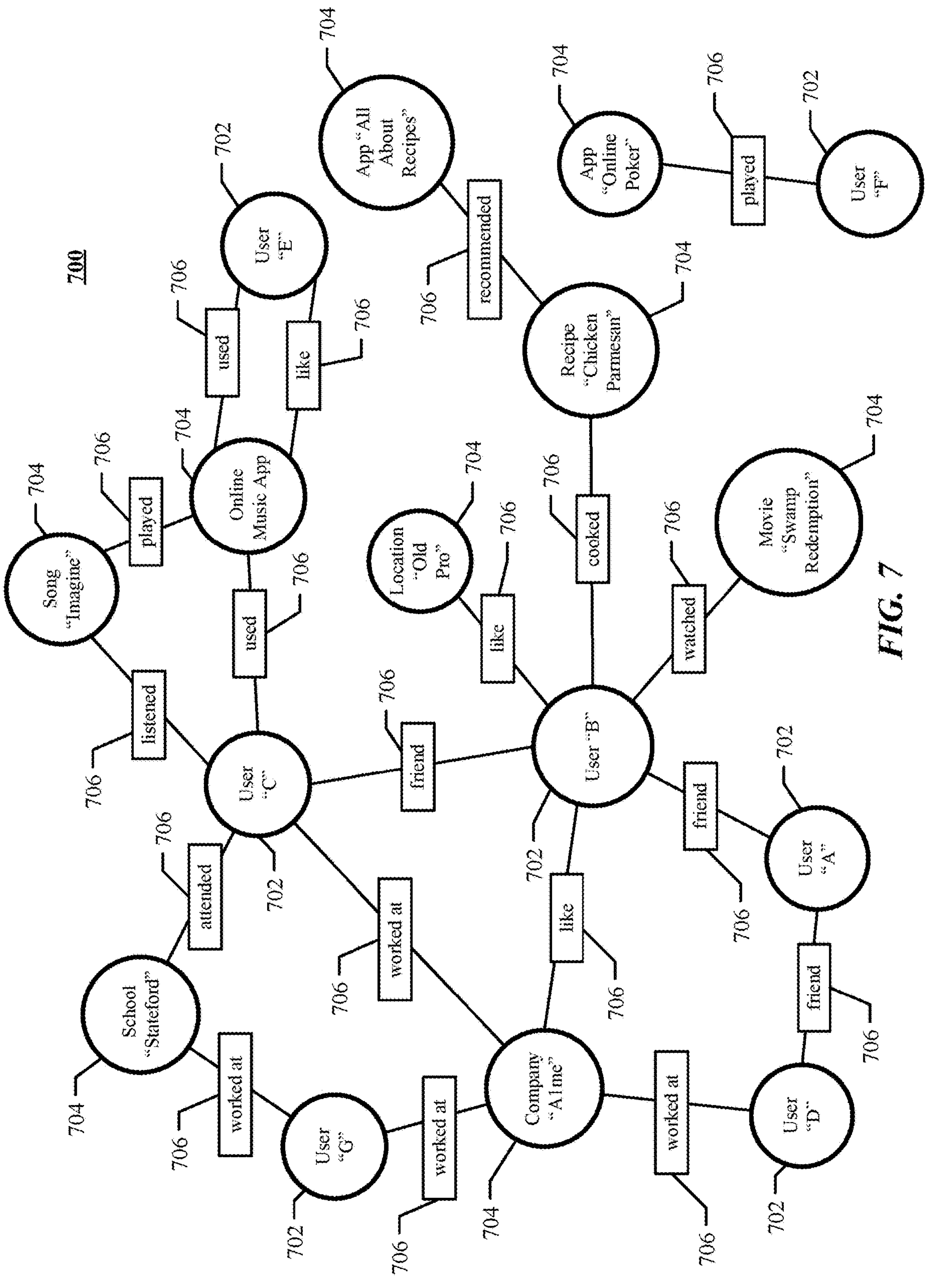
FIG. 7 illustrates an example social graph.

FIG. 7 illustrates an example social graph 700. In particular embodiments, the social-networking system 160 may store one or more social graphs 700 in one or more data stores. In particular embodiments, the social graph 700 may include multiple nodes—which may include multiple user nodes 702 or multiple concept nodes 704—and multiple edges 706 connecting the nodes. Each node may be associated with a unique entity (i.e., user or concept), each of which may have a unique identifier (ID), such as a unique number or username. The example social graph 700 illustrated in FIG. 7 is shown, for didactic purposes, in a two-dimensional visual map representation. In particular embodiments, a social-networking system 160, a client system 130, an assistant system 140, or a third-party system 170 may access the social graph 700 and related social-graph information for suitable applications. The nodes and edges of the social graph 700 may be stored as data objects, for example, in a data store (such as a social-graph database). Such a data store may include one or more searchable or queryable indexes of nodes or edges of the social graph 700.

In particular embodiments, a user node 702 may correspond to a user of the social-networking system 160 or the assistant system 140. As an example and not by way of limitation, a user may be an individual (human user), an entity (e.g., an enterprise, business, or third-party application), or a group (e.g., of individuals or entities) that interacts or communicates with or over the social-networking system 160 or the assistant system 140. In particular embodiments, when a user registers for an account with the social-networking system 160, the social-networking system 160 may create a user node 702 corresponding to the user, and store the user node 702 in one or more data stores. Users and user nodes 702 described herein may, where appropriate, refer to registered users and user nodes 702 associated with registered users. In addition or as an alternative, users and user nodes 702 described herein may, where appropriate, refer to users that have not registered with the social-networking system 160. In particular embodiments, a user node 702 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 702 may be associated with one or more data objects corresponding to information associated with a user. In particular embodiments, a user node 702 may correspond to one or more web interfaces.

In particular embodiments, a concept node 704 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 704 may be associated with information of a concept provided by a user or information gathered by various systems, including the social-networking system 160 and the assistant system 140. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 704 may be associated with one or more data objects corresponding to information associated with concept node 704. In particular embodiments, a concept node 704 may correspond to one or more web interfaces.

In particular embodiments, a node in the social graph 700 may represent or be represented by a web interface (which may be referred to as a "profile interface"). Profile interfaces may be hosted by or accessible to the social-networking system 160 or the assistant system 140. Profile interfaces may also be hosted on third-party websites associated with a third-party system 170. As an example and not by way of limitation, a profile interface corresponding to a particular external web interface may be the particular external web interface and the profile interface may correspond to a particular concept node 704. Profile interfaces may be viewable by all or a selected subset of other users. As an example and not by way of limitation, a user node 702 may have a corresponding user-profile interface in which the corresponding user may add content, make declarations, or otherwise express himself or herself. As another example and not by way of limitation, a concept node 704 may have a corresponding concept-profile interface in which one or more users may add content, make declarations, or express themselves, particularly in relation to the concept corresponding to concept node 704.

In particular embodiments, a concept node 704 may represent a third-party web interface or resource hosted by a third-party system 170. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 702 corresponding to the user and a concept node 704 corresponding to the third-party web interface or resource and store edge 706 in one or more data stores.

In particular embodiments, a pair of nodes in the social graph 700 may be connected to each other by one or more edges 706. An edge 706 connecting a pair of nodes may represent a relationship between the pair of nodes. In particular embodiments, an edge 706 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 706 connecting the first user's user node 702 to the second user's user node 702 in the social graph 700 and store edge 706 as social-graph information in one or more of data stores 164. In the example of FIG. 7, the social graph 700 includes an edge 706 indicating a friend relation between user nodes 702 of user "A" and user "B" and an edge indicating a friend relation between user nodes 702 of user "C" and user "B." Although this disclosure describes or illustrates particular edges 706 with particular attributes connecting particular user nodes 702, this disclosure contemplates any suitable edges 706 with any suitable attributes connecting user nodes 702. As an example and not by way of limitation, an edge 706 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 700 by one or more edges 706.

In particular embodiments, an edge 706 between a user node 702 and a concept node 704 may represent a particular action or activity performed by a user associated with user node 702 toward a concept associated with a concept node 704. As an example and not by way of limitation, as illustrated in FIG. 7, a user may "like," "attended," "played," "listened," "cooked," "worked at," or "watched" a concept, each of which may correspond to an edge type or subtype. A concept-profile interface corresponding to a concept node 704 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (Online Music App, which is an online music application). In this case, the social-networking system 160 may create a "listened" edge 706 and a "used" edge (as illustrated in FIG. 7) between user nodes 702 corresponding to the user and concept nodes 704 corresponding to the song and application to indicate that the user listened to the song and used the application. Moreover, the social-networking system 160 may create a "played" edge 706 (as illustrated in FIG. 7) between concept nodes 704 corresponding to the song and the application to indicate that the particular song was played by the particular application. In this case, "played" edge 706 corresponds to an action performed by an external application (Online Music App) on an external audio file (the song "Imagine"). Although this disclosure describes particular edges 706 with particular attributes connecting user nodes 702 and concept nodes 704, this disclosure contemplates any suitable edges 706 with any suitable attributes connecting user nodes 702 and concept nodes 704. Moreover, although this disclosure describes edges between a user node 702 and a concept node 704 representing a single relationship, this disclosure contemplates edges between a user node 702 and a concept node 704 representing one or more relationships. As an example and not by way of limitation, an edge 706 may represent both that a user likes and has used at a particular concept. Alternatively, another edge 706 may represent each type of relationship (or multiples of a single relationship) between a user node 702 and a concept node 704 (as illustrated in FIG. 7 between user node 702 for user "E" and concept node 704 for "Online Music App").

In particular embodiments, the social-networking system 160 may create an edge 706 between a user node 702 and a concept node 704 in the social graph 700. As an example and not by way of limitation, a user viewing a concept-profile interface (such as, for example, by using a web browser or a special-purpose application hosted by the user's client system 130) may indicate that he or she likes the concept represented by the concept node 704 by clicking or selecting a "Like" icon, which may cause the user's client system 130 to send to the social-networking system 160 a message indicating the user's liking of the concept associated with the concept-profile interface. In response to the message, the social-networking system 160 may create an edge 706 between user node 702 associated with the user and concept node 704, as illustrated by "like" edge 706 between the user and concept node 704. In particular embodiments, the social-networking system 160 may store an edge 706 in one or more data stores. In particular embodiments, an edge 706 may be automatically formed by the social-networking system 160 in response to a particular user action. As an example and not by way of limitation, if a first user uploads a picture, watches a movie, or listens to a song, an edge 706 may be formed between user node 702 corresponding to the first user and concept nodes 704 corresponding to those concepts. Although this disclosure describes forming particular edges 706 in particular manners, this disclosure contemplates forming any suitable edges 706 in any suitable manner.

Vector Spaces and Embeddings

Figure 8:
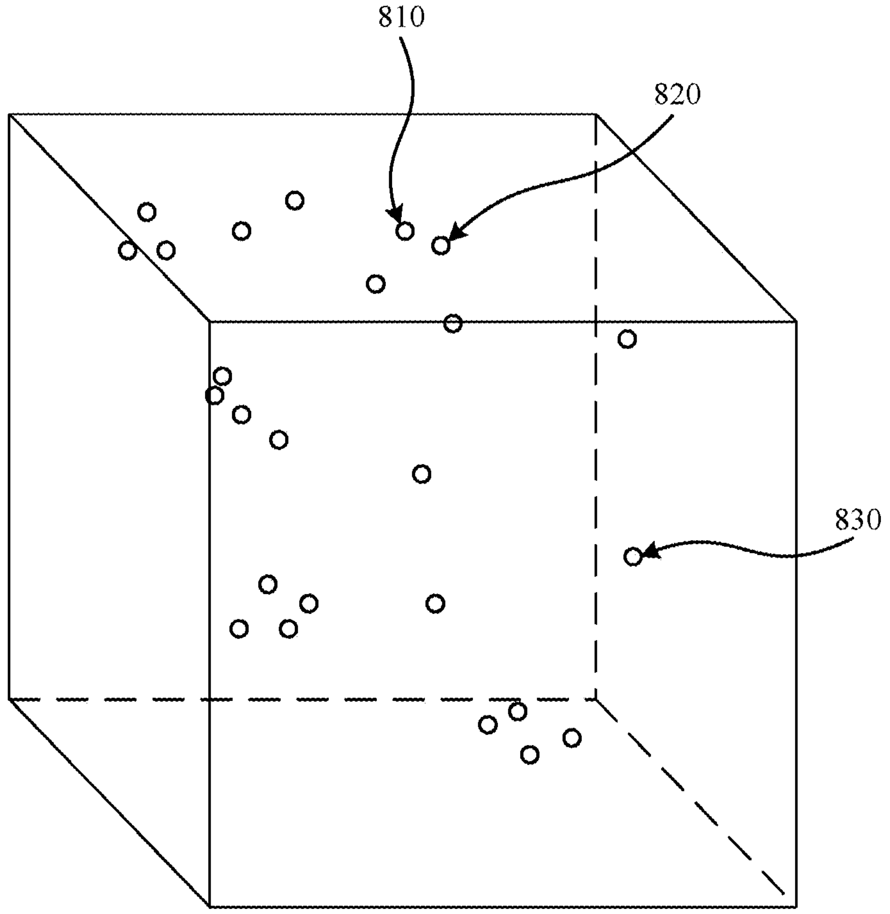
FIG. 8 illustrates an example view of an embedding space.

FIG. 8 illustrates an example view of a vector space 800. In particular embodiments, an object or an n-gram may be represented in a d-dimensional vector space, where d denotes any suitable number of dimensions. Although the vector space 800 is illustrated as a three-dimensional space, this is for illustrative purposes only, as the vector space 800 may be of any suitable dimension. In particular embodiments, an n-gram may be represented in the vector space 800 as a vector referred to as a term embedding. Each vector may comprise coordinates corresponding to a particular point in the vector space 800 (i.e., the terminal point of the vector). As an example and not by way of limitation, vectors 810, 820, and 830 may be represented as points in the vector space 800, as illustrated in FIG. 8. An n-gram may be mapped to a respective vector representation. As an example and not by way of limitation, n-grams $t_1$ and $t_2$ may be mapped to vectors $\vec{v_1}$ and $\vec{v_2}$ in the vector space 800, respectively, by applying a function $\vec{\pi}$ defined by a dictionary, such that $\vec{v_1}=\vec{\pi}(t_1)$ and $\vec{v_2}=\vec{\pi}(t_2)$. As another example and not by way of limitation, a dictionary trained to map text to a vector representation may be utilized, or such a dictionary may be itself generated via training. As another example and not by way of limitation, a model, such as Word2vec, may be used to map an n-gram to a vector representation in the vector space 800. In particular embodiments, an n-gram may be mapped to a vector representation in the vector space 800 by using a machine leaning model (e.g., a neural network). The machine learning model may have been trained using a sequence of training data (e.g., a corpus of objects each comprising n-grams).

In particular embodiments, an object may be represented in the vector space 800 as a vector referred to as a feature vector or an object embedding. As an example and not by way of limitation, objects $e_1$ and $e_2$ may be mapped to vectors $\vec{v_1}$ and $\vec{v_2}$ in the vector space 800, respectively, by applying a function $\vec{\pi}$, such that that $\vec{v_1}=\vec{\pi}(e_1)$ and $\vec{v_2}=\vec{\pi}(e_2)$. In particular embodiments, an object may be mapped to a vector based on one or more properties, attributes, or features of the object, relationships of the object with other objects, or any other suitable information associated with the object. As an example and not by way of limitation, a function i may map objects to vectors by feature extraction, which may start from an initial set of measured data and build derived values (e.g., features). As an example and not by way of limitation, an object comprising a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. In particular embodiments, when an object has data that is either too large to be efficiently processed or comprises redundant data, a function $\vec{\pi}$ may map the object to a vector using a transformed reduced set of features (e.g., feature selection). In particular embodiments, a function $\vec{\pi}$ may map an object e to a vector it (e) based on one or more n-grams associated with object e. Although this disclosure describes representing an n-gram or an object in a vector space in a particular manner, this disclosure contemplates representing an n-gram or an object in a vector space in any suitable manner.

In particular embodiments, the social-networking system 160 may calculate a similarity metric of vectors in vector space 800. A similarity metric may be a cosine similarity, a Minkowski distance, a Mahalanobis distance, a Jaccard similarity coefficient, or any suitable similarity metric. As an example and not by way of limitation, a similarity metric of $\vec{v_1}$ and $\vec{v_2}$ may be a cosine similarity $$\frac{\vec{v_1}\cdot\vec{v_2}}{\|\vec{v_1}\|\,\|\vec{v_2}\|}.$$

As another example and not by way of limitation, a similarity metric of $\vec{v_1}$ and $\vec{v_2}$ may be a Euclidean distance $\|\vec{v_1}-\vec{v_2}\|$. A similarity metric of two vectors may represent how similar the two objects or n-grams corresponding to the two vectors, respectively, are to one another, as measured by the distance between the two vectors in the vector space 800. As an example and not by way of limitation, vector 810 and vector 820 may correspond to objects that are more similar to one another than the objects corresponding to vector 810 and vector 830, based on the distance between the respective vectors. Although this disclosure describes calculating a similarity metric between vectors in a particular manner, this disclosure contemplates calculating a similarity metric between vectors in any suitable manner.

More information on vector spaces, embeddings, feature vectors, and similarity metrics may be found in U.S. patent application Ser. No. 14/949,436, filed 23 Nov. 2015, U.S. patent application Ser. No. 15/286,315, filed 5 Oct. 2016, and U.S. patent application Ser. No. 15/365,789, filed 30 Nov. 2016, each of which is incorporated by reference.

Artificial Neural Networks

Figure 9:
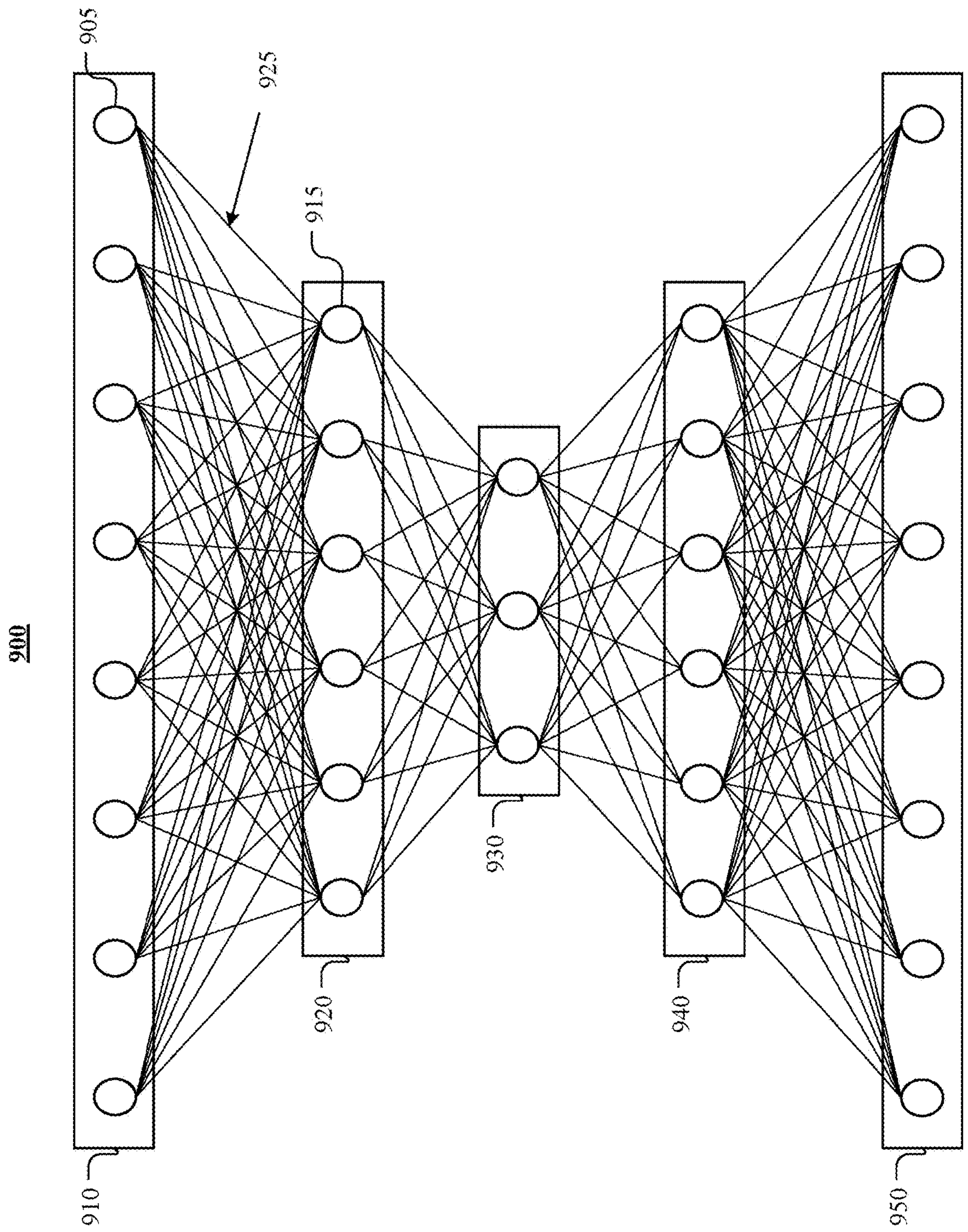
FIG. 9 illustrates an example artificial neural network.

FIG. 9 illustrates an example artificial neural network ("ANN") 900. In particular embodiments, an ANN may refer to a computational model comprising one or more nodes. Example ANN 900 may comprise an input layer 910, hidden layers 920, 930, 940, and an output layer 950. Each layer of the ANN 900 may comprise one or more nodes, such as a node 905 or a node 915. In particular embodiments, each node of an ANN may be connected to another node of the ANN. As an example and not by way of limitation, each node of the input layer 910 may be connected to one of more nodes of the hidden layer 920. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 9 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 9 depicts a connection between each node of the input layer 910 and each node of the hidden layer 920, one or more nodes of the input layer 910 may not be connected to one or more nodes of the hidden layer 920.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 920 may comprise the output of one or more nodes of the input layer 910. As another example and not by way of limitation, the input to each node of the output layer 950 may comprise the output of one or more nodes of the hidden layer 940. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1 + e^{-s_k}},$$

the hyperbolic tangent function $$F_k(s_k) = \frac{e^{s_k} - e^{-s_k}}{e^{s_k} - e^{-s_k}}$$

the rectifier $F_k(s_k)=\max(0, s_k)$, or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 925 between the node 905 and the node 915 may have a weighting coefficient of 0.4, which may indicate that 0.4 multiplied by the output of the node 905 is used as an input to the node 915. As another example and not by way of limitation, the output $y_k$ of node k may be $y_k=F_k(s_k)$, where $F_k$ may be the activation function corresponding to node k, $s_k=\Sigma_j(w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN 900 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Privacy

In particular embodiments, one or more objects (e.g., content or other types of objects) of a computing system may be associated with one or more privacy settings. The one or more objects may be stored on or otherwise associated with any suitable computing system or application, such as, for example, a social-networking system 160, a client system 130, an assistant system 140, a third-party system 170, a social-networking application, an assistant application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node 704 corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system 160 or assistant system 140 or shared with other systems (e.g., a third-party system 170). Although this disclosure describes using particular privacy settings in a particular manner, this disclosure contemplates using any suitable privacy settings in any suitable manner.

In particular embodiments, privacy settings may be based on one or more nodes or edges of a social graph 700. A privacy setting may be specified for one or more edges 706 or edge-types of the social graph 700, or with respect to one or more nodes 702, 704 or node-types of the social graph 700. The privacy settings applied to a particular edge 706 connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system 160. The object may be associated with a concept node 704 connected to a user node 702 of the first user by an edge 706. The first user may specify privacy settings that apply to a particular edge 706 connecting to the concept node 704 of the object, or may specify privacy settings that apply to all edges 706 connecting to the concept node 704. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system 160 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system 160 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and the object may be sent only to the user (or a client system 130 of the user) if the authorization server determines that the user is authorized to access the object based on the privacy settings associated with the object. If the requesting user is not authorized to access the object, the authorization server may prevent the requested object from being retrieved from the data store 164 or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system 160, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system 160 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in)

whether the social-networking system 160 or assistant system 140 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system 160 or assistant system 140 may access such information in order to provide a particular function or service to the first user, without the social-networking system 160 or assistant system 140 having access to that information for any other purposes. Before accessing, storing, or using such objects or information, the social-networking system 160 or assistant system 140 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 160 or assistant system 140.

In particular embodiments, a user may specify whether particular types of objects or information associated with the first user may be accessed, stored, or used by the social-networking system 160 or assistant system 140. As an example and not by way of limitation, the first user may specify that images sent by the first user through the social-networking system 160 or assistant system 140 may not be stored by the social-networking system 160 or assistant system 140. As another example and not by way of limitation, a first user may specify that messages sent from the first user to a particular second user may not be stored by the social-networking system 160 or assistant system 140. As yet another example and not by way of limitation, a first user may specify that all objects sent via a particular application may be saved by the social-networking system 160 or assistant system 140.

In particular embodiments, privacy settings may allow a first user to specify whether particular objects or information associated with the first user may be accessed from particular client systems 130 or third-party systems 170. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system 160 or assistant system 140 may provide default privacy settings with respect to each device, system, or application, and/or the first user may be prompted to specify a particular privacy setting for each context. As an example and not by way of limitation, the first user may utilize a location-services feature of the social-networking system 160 or assistant system 140 to provide recommendations for restaurants or other places in proximity to the user. The first user's default privacy settings may specify that the social-networking system 160 or assistant system 140 may use location information provided from a client device 130 of the first user to provide the location-based services, but that the social-networking system 160 or assistant system 140 may not store the location information of the first user or provide it to any third-party system 170. The first user may then update the privacy settings to allow location information to be used by a third-party image-sharing application in order to geo-tag photos.

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular embodiments, the social-networking system 160 or assistant system 140 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the social-networking system 160 or assistant system 140. The user's privacy settings may specify that such information may be used only for particular processes, such as authentication, and further specify that such information may not be shared with any third-party system 170 or used for other processes or applications associated with the social-networking system 160 or assistant system 140. As another example and not by way of limitation, the social-networking system 160 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system 170 or used by other processes or applications associated with the social-networking system 160. As another example and not by way of limitation, the social-networking system 160 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such image may be used only for a limited purpose (e.g., authentication, tagging the user in photos), and further specify that such image may not be shared with any third-party system 170 or used by other processes or applications associated with the social-networking system 160.

Systems and Methods

Figure 10:
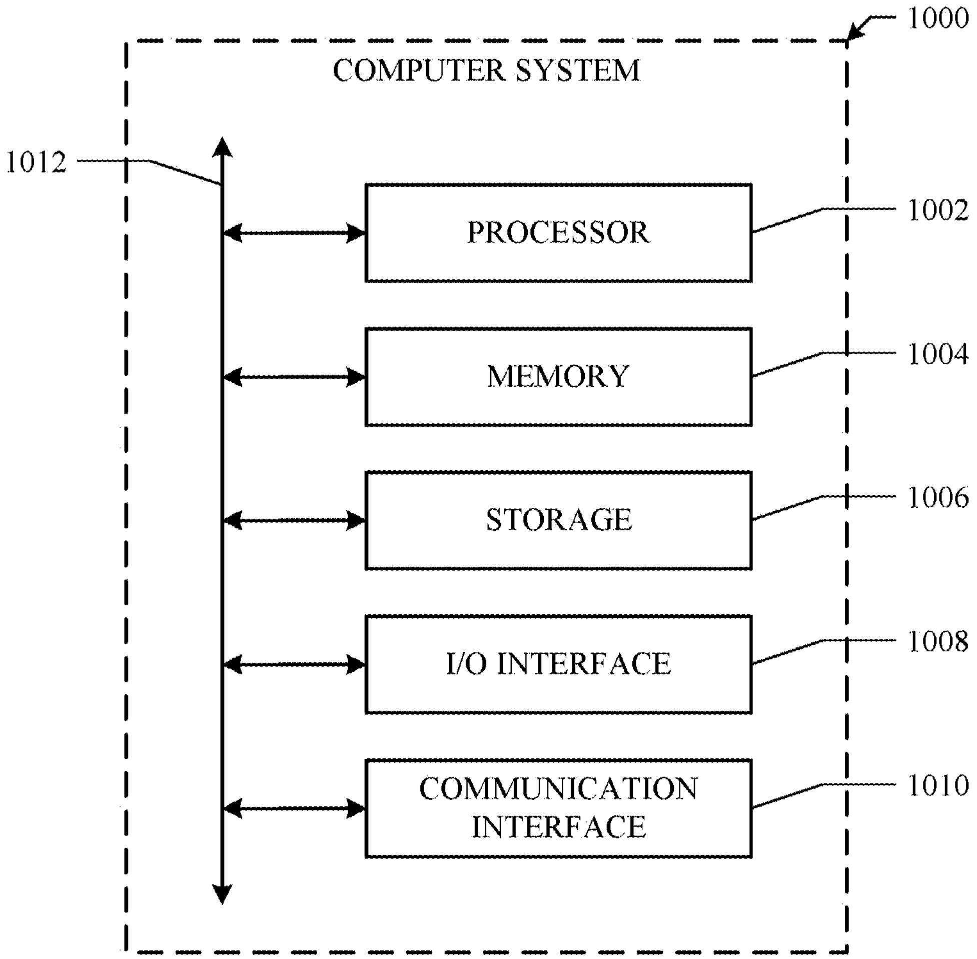
FIG. 10 illustrates an example computer system.

FIG. 10 illustrates an example computer system 1000. In particular embodiments, one or more computer systems

1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
receiving an input from a user that includes (i) a gesture input or (ii) a speech input;
in accordance with receiving the input from the user, identifying a respective input tuple from a set of input tuples of known gesture inputs and corresponding known speech inputs associated with a particular user intent;
determining whether the input from the user satisfies a confidence score for a respective known gesture input or a respective known speech input of the respective input tuple; and
in accordance with determining that the input from the user satisfies the confidence score, providing an input to an assistant system corresponding to the particular user intent.

2. The method of claim 1, further comprising:
receiving another input from the user that includes (i) the gesture input or (ii) the speech input;
determining whether the other input from the user satisfies the confidence score for the respective known gesture input or the respective known speech input; and
in accordance with determining that the other input from the user does not satisfy the confidence score, prompting the user to provide a different input to disambiguate a respective intent of the other input.

3. The method of claim 2, wherein:
the other input is the gesture input; and
the different input that the user is prompted to provide is the respective known speech input corresponding to the respective input tuple.

4. The method of claim 2, further comprising:
in accordance with determining that the other input from the user does not satisfy the confidence score, presenting a user interface generated by the assistant system based on content of the other input, the user interface including one or more of (i) text, (ii) image, (iii) video, and (iv) an animation of a gesture.

5. The method of claim 3, wherein:
the other input is the gesture input, and
the different input that the user is prompted to provide includes the user performing the other input again while simultaneously speaking to the assistant system regarding an intent associated with the gesture input.

6. The method of claim 2, further comprising:
receiving the other input, wherein the other input indicates a disambiguated intent associated with the different input; and
adjusting, based on the disambiguated intent, the respective input tuple.

7. The method of claim 1, wherein:
the input is the gesture input, and
the gesture input from the user includes eye movement of the user detected by smart glasses associated with the assistant system.

8. A non-transitory, computer-readable medium storing instructions that, when executed by one or more processors of a computing system, causing the system to:
receive an input from a user that includes one of (i) a gesture input, or (ii) a speech input;
in accordance with receiving the input from the user, identify a respective input tuple from a set of input tuples of known gesture inputs and corresponding known speech inputs associated with a particular user intent;
determine whether the input from the user satisfies a confidence score with respect to one of a respective known gesture input or a respective known speech input of the respective input tuple; and
in accordance with determining that the input from the user satisfies the confidence score, provide an input to an assistant system corresponding to the particular user intent.

9. The computer-readable medium of claim 8, further comprising:
receiving another input from the user that includes one of (i) the gesture input, or (ii) the speech input;
determining whether the other input from the user satisfies the confidence score with respect to the respective known gesture input or the respective known speech input; and
in accordance with determining that the other input from the user does not satisfy the confidence score, prompting the user to provide a different input corresponding to another respective known input from the respective input tuple.

10. The computer-readable medium of claim 9, wherein:
the other input is a gesture input; and
the different input that the user is prompted to provide is the respective known speech input corresponding to the respective input tuple.

11. The computer-readable medium of claim 9, further comprising:
in accordance with determining that the other input from the user does not satisfy the confidence score, presenting a user interface generated by the assistant system based on content of the other input, the user interface including one or more of (i) text, (ii) image, (iii) video, and (iv) an animation of a gesture.

12. The computer-readable medium of claim 9, wherein:
the other input is a gesture input, and
the different input that the user is prompted to provide includes the user performing the other input again while simultaneously speaking to the assistant system regarding an intent associated with the gesture input.

13. The computer-readable medium of claim 9, further comprising:
receiving the other input, wherein the other input indicates a disambiguated intent associated with the different input; and
adjusting, based on the disambiguated intent, the respective input tuple.

14. The computer-readable medium of claim 8, wherein:
the input is a gesture input, and
the gesture input from the user includes eye movement of the user.

15. A system, comprising:
a microphone; a camera;
one or more processors communicatively coupled to the microphone and the camera;
one or more non-transitory, computer-readable media storing instructions that, when executed by at least one of the one or more processors, cause the system to:
receive an input from a user that includes one of (i) a gesture input, or (ii) a speech input;
in accordance with receiving the input from the user, identify a respective input tuple from a set of input tuples of known gesture inputs and corresponding known speech inputs associated with a particular user intent;

determine whether the input from the user satisfies a confidence score with respect to one of a respective known gesture input or a respective known speech input of the respective input tuple; and in accordance with determining that the input from the user satisfies the confidence score, provide an input to an assistant system corresponding to the particular user intent.

16. The system of claim 15, further comprising:

receiving another input from the user that includes one of (i) the gesture input, or (ii) the speech input;

determining whether the other input from the user satisfies the confidence score with respect to the respective known gesture input or the respective known speech input; and in accordance with determining that the other input from the user does not satisfy the confidence score, prompting the user to provide a different input corresponding to another respective known input from the respective input tuple.

17. The system of claim 16, wherein:

the other input is a gesture input; and the different input that the user is prompted to provide is the respective known speech input corresponding to the respective input tuple.

18. The system of claim 16, further comprising:

in accordance with determining that the other input from the user does not satisfy the confidence score, presenting a user interface generated by the assistant system based on content of the other input, the user interface including one or more of (i) text, (ii) image, (iii) video, and (iv) an animation of a gesture.

19. The system of claim 16, wherein:

the other input is a gesture input, and the different input that the user is prompted to provide includes the user performing the other input again while simultaneously speaking to the assistant system regarding an intent associated with the gesture input.

20. The system of claim 16, further comprising:

receiving the other input, wherein the other input indicates a disambiguated intent associated with the different input; and adjusting, based on the disambiguated intent, the respective input tuple.

* * * * *